United States Patent
Kim et al.

(10) Patent No.: US 11,582,692 B2
(45) Date of Patent: Feb. 14, 2023

(54) METHOD FOR COMMUNICATION IN WIRELESS LAN SYSTEM AND WIRELESS TERMINAL USING SAME

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Taewon Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 17/050,824

(22) PCT Filed: Apr. 22, 2019

(86) PCT No.: PCT/KR2019/004816
§ 371 (c)(1),
(2) Date: Oct. 26, 2020

(87) PCT Pub. No.: WO2019/208988
PCT Pub. Date: Oct. 31, 2019

(65) Prior Publication Data
US 2021/0051580 A1 Feb. 18, 2021

(30) Foreign Application Priority Data
Apr. 27, 2018 (KR) ......................... 10-2018-0049293

(51) Int. Cl.
*H04W 52/02* (2009.01)
*H04L 5/00* (2006.01)
(Continued)

(52) U.S. Cl.
CPC ....... *H04W 52/0206* (2013.01); *H04L 5/0055* (2013.01); *H04L 27/02* (2013.01); *H04W 80/02* (2013.01); *H04W 84/12* (2013.01)

(58) Field of Classification Search
CPC ............. H04W 52/0206; H04W 52/02; H04W 52/0229; H04W 52/0235; H04W 52/0216;
(Continued)

(56) References Cited

U.S. PATENT DOCUMENTS

| 2017/0111858 A1* | 4/2017 | Azizi .................... H04L 5/0053 |
| 2018/0020404 A1* | 1/2018 | Huang ............... H04W 52/0229 |
| 2019/0110250 A1* | 4/2019 | Huang ............... H04W 72/0446 |
| 2019/0116554 A1* | 4/2019 | Kristem ............. H04L 27/2602 |

(Continued)

FOREIGN PATENT DOCUMENTS

WO     2018/056680     3/2018

OTHER PUBLICATIONS

PCT International Application No. PCT/KR2019/004816, International Search Report dated Jul. 30, 2019, 2 pages.
(Continued)

*Primary Examiner* — Un C Cho
*Assistant Examiner* — Rasha K Fayed
(74) *Attorney, Agent, or Firm* — Lee Hong Degerman Kang Waimey

(57) ABSTRACT

The present specification proposes a technical feature related to a wake-up radio (WUR) STA. Specifically, proposed is an operation of updating a parameter related to an operation of a WUR mode. For example, the WUR STA may update a parameter related to the WUR mode by receiving an unsolicited frame from an AP while maintaining the WUR mode. The received frame may have a preset action type.

6 Claims, 20 Drawing Sheets

(51) Int. Cl.
    *H04L 27/02*     (2006.01)
    *H04W 80/02*     (2009.01)
    *H04W 84/12*     (2009.01)

(58) Field of Classification Search
    CPC . H04W 52/0209; H04W 80/02; H04W 74/00; H04W 74/08; H04W 74/002; H04W 74/06; H04W 74/0816; H04W 84/12; H04W 88/02; H04W 4/008; H04W 48/16; H04W 48/10; H04W 8/24; H04L 5/0055; H04L 5/0091; H04L 5/0007; H04L 27/02; H04L 27/2628; H04L 27/26; H04L 27/06; H04L 27/2602; H04L 27/2613; H04L 27/2675; H04L 27/26025; H04L 27/04; H04L 27/2605; H04L 67/145; Y02D 30/70
See application file for complete search history.

(56) References Cited

U.S. PATENT DOCUMENTS

| | | | |
|---|---|---|---|
| 2019/0191376 A1* | 6/2019 | Kim | H04W 74/08 |
| 2019/0246355 A1* | 8/2019 | Guo | H04W 52/0235 |
| 2020/0037251 A1* | 1/2020 | Du | H04W 28/065 |
| 2020/0178171 A1* | 6/2020 | Lou | H04W 76/28 |
| 2020/0236624 A1* | 7/2020 | Kim | H04W 76/28 |
| 2021/0153121 A1* | 5/2021 | Huang | H04W 52/0216 |
| 2021/0185597 A1* | 6/2021 | Chitrakar | H04W 52/0235 |

OTHER PUBLICATIONS

Intel, "Spec Text for Channel Access, Duty Cycle Operation, and WUR Mode," LB2051, IEEE 802.11, Mar. 6, 2018, 11 pages.

LG Electronics et al., "Duty cycle mode STA's PS follow-up," IEEE 802.11-17/1356r4, Nov. 14, 2017, 11 pages.

* cited by examiner

FIG. 1
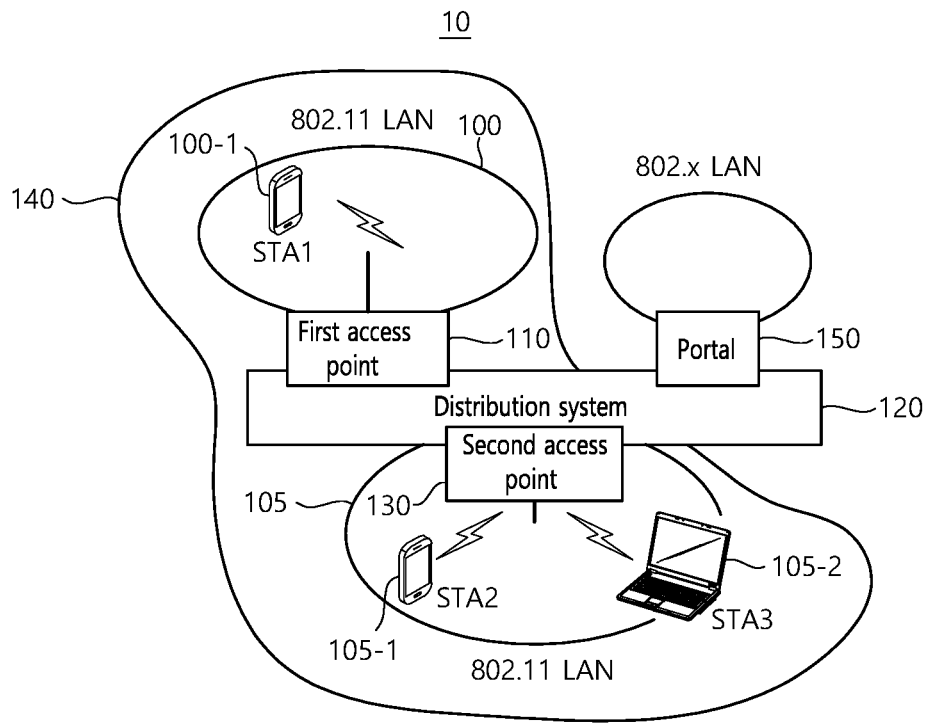
(A)
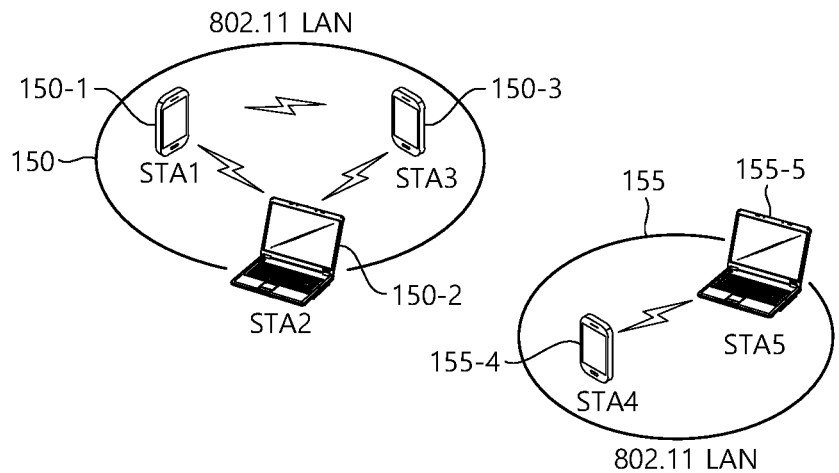
(B)

FIG. 4
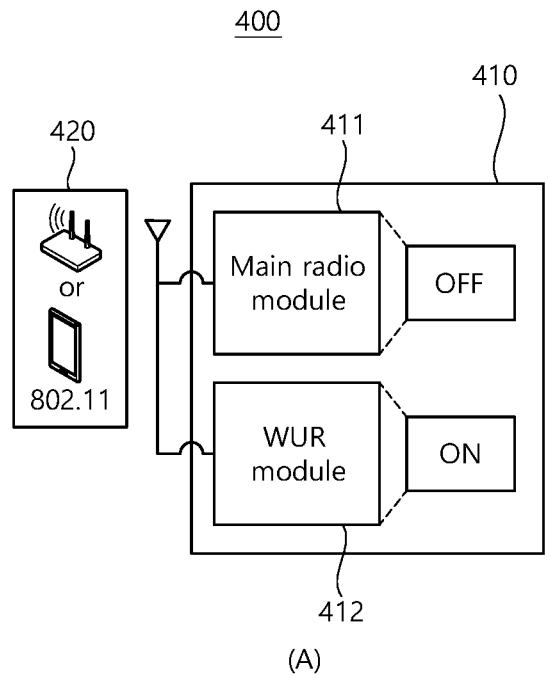
(A)
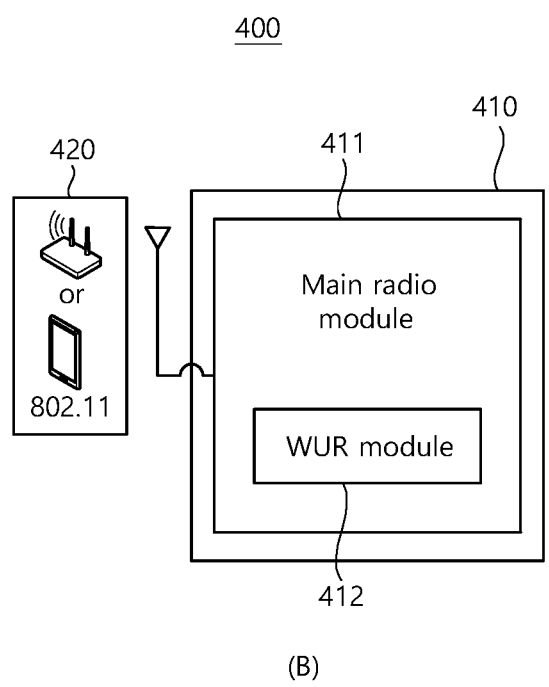
(B)

FIG. 15

| Action Type value | Meaning |
|---|---|
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6-255 | Reserved |

FIG. 17

| Element ID | Length | Element ID Extension | Minimum Wake-up Duration | Duty Cycle Period Units | WUR Operation Class | WUR Channel | WUR Beacon Period |
|---|---|---|---|---|---|---|---|
| 1 | 1 | 1 | TBD | TBD | 1 | 1 | TBD |

Octets:

METHOD FOR COMMUNICATION IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2019/004816, filed on Apr. 22, 2019, which claims the benefit of earlier filing date and right of priority to Korean Application No. 10-2018-0049293, filed on Apr. 27, 2018, the contents of which are all hereby incorporated by reference herein in their entirety.

BACKGROUND OF THE DISCLOSURE

Field of the Disclosure

This specification is related to wireless communication and, most particularly, to a method for performing communication in a wireless LAN system and a wireless user equipment using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

Furthermore, in order to extend battery life of device and sensors existing in an Internet of Things (IOT) network while maintaining optimal device performance, a Wake-up Radio (WUR) scheme, which is a scheme for waking a device only in a case where data transmission is needed, may be considered. The WUR scheme may be specified by, for example, the Institute of Electrical and Electronics Engineers (IEEE) 802.11ba standard.

SUMMARY OF THE DISCLOSURE

Technical Objects

An object of this specification is to provide a method for performing communication in a wireless LAN system and a wireless user equipment (UE) using the same having enhanced capability in light of consumption power based on low-power operations using a WUR module. More specifically, proposed herein is a detailed method for updating WUR parameters being used for low power.

Technical Solutions

According to an example of this specification, proposed herein is a method for a wireless Local Area Network (WLAN) system.

For example, according to an example of this specification, an STA includes a main radio module receiving a WLAN packet and a Wake-Up Radio (WUR) module receiving a Wake-Up Radio (WUR) packet being modulated by an On-Off Keying (OOK) scheme.

The STA may enter a WUR mode, and the WUR mode may be a period during which a WUR module alternates between a WUR on state and a WUR doze state.

In the WUR mode, the STA may receive a control frame for updating parameters related to the WUR mode from an Access Point (AP) STA. And, herein, the control frame may include a preconfigured action type value and an updated WUR parameter.

After transmitting an acknowledge (ACK) frame for the control frame to the AP, the STA may be operated based on the updated WUR parameter.

Effects of the Disclosure

According to an embodiment of this specification, provided herein is a method for performing communication in a wireless LAN system and a wireless user equipment (UE) using the same having enhanced capability in light of consumption power based on low-power operations using a WUR module. Additionally, proposed herein is a detailed method for updating WUR parameters being used for low power.

BRIEF DESCRIPTION OF THE DRAWINGS

FIG. 1 is a conceptual diagram illustrating a structure of a WLAN system.

FIG. 4 is an internal block diagram of a wireless user equipment (UE) (or terminal) receiving a wake-up packet.

FIG. 15 illustrates an example of an Action Type included in a WPC frame.

FIG. 17 illustrates another example of detailed information included in a WPC frame.

DESCRIPTION OF EXEMPLARY EMBODIMENTS

Figure 2:
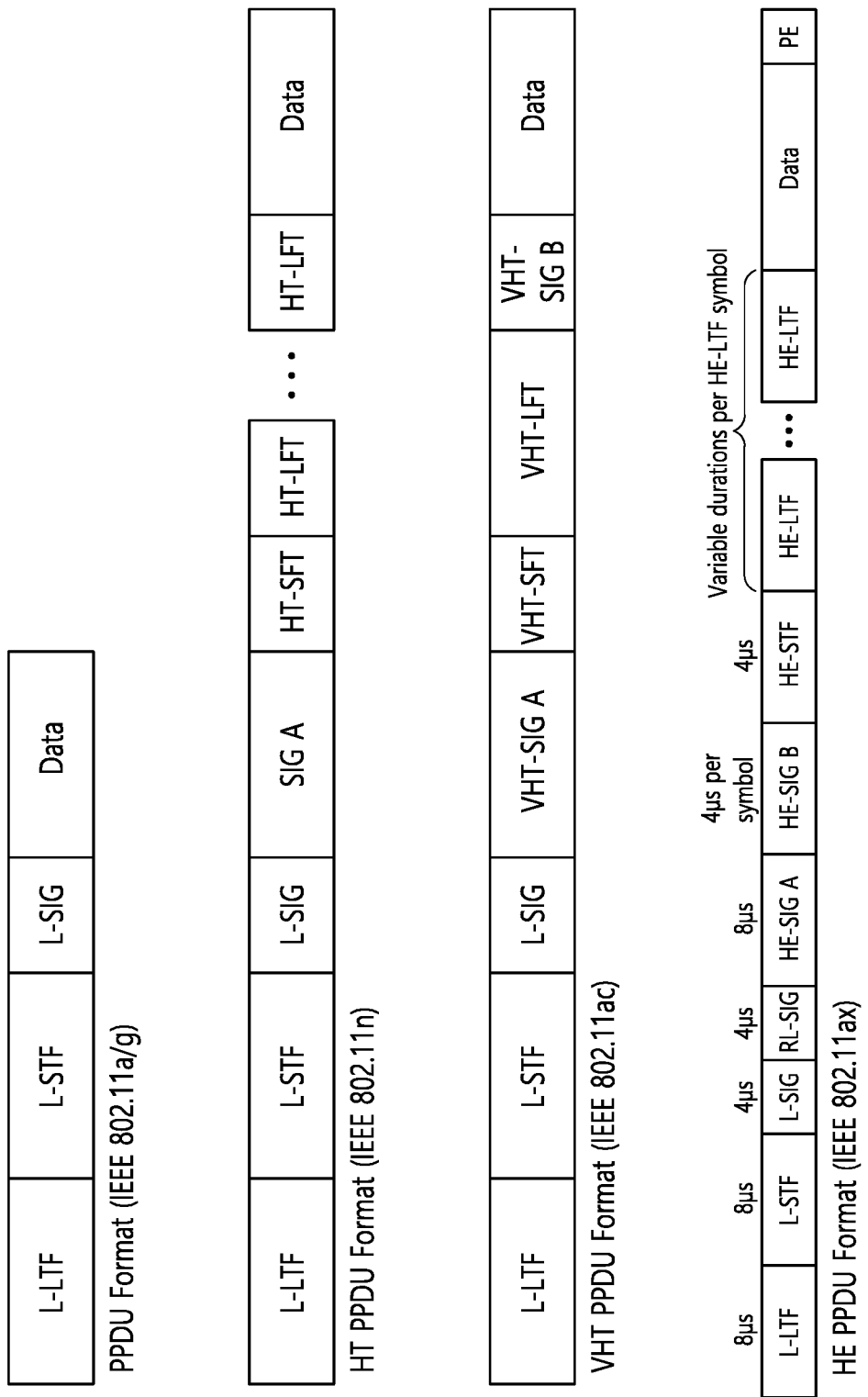
FIG. 2 is a diagram illustrating an example of a PPDU used in an IEEE standard.

A slash (/) or comma (,) used in this specification may mean "and/or". For example, since "A/B" means "A and/or B", this may mean "only A" or "only B" or "one of A and B". Additionally, technical characteristics being individually described in one drawing (or diagram) may be individually implemented, or may be simultaneously implemented.

Additionally, parentheses being used in this specification may mean "for example". More specifically, in case it is indicated as "control information (WUR-Signal)", "WUR-Signal" may be proposed as an example of "control information". Additionally, even in a case where it is indicated as "control information (i.e., WUR-Signal)", "WUR-Signal" may be proposed as an example of "control information".

FIG. 1 is a conceptual diagram illustrating a structure of a WLAN system. (A) of FIG. 1 illustrates a structure of an infrastructure network of institute of electrical and electronic engineers (IEEE) 802.11.

Referring to (A) of FIG. 1, a WLAN system (10) of (A) of FIG. 1 may include at least one basic service set (hereinafter, referred to as 'BSS') (100, 105). The BSS is a set of access points (hereinafter, APs) and stations (hereinafter, STAs) that can successfully synchronize and communicate with each other and is not a concept indicating a specific area.

For example, a first BSS (100) may include a first AP (110) and one first STA (100-1). A second BSS (105) may include a second AP (130) and one or more STAs (105-1, 105-2).

The infrastructure BSSs (100, 105) may include at least one STA, APs (110, 130) for providing a distribution service, and a distribution system (DS) (120) for connecting a plurality of APs.

The DS (120) may connect a plurality of BSSs (100, 105) to implement an extended service set (hereinafter, 'ESS') (140). The ESS (140) may be used as a term indicating one network to which at least one AP (110, 130) is connected through the DS (120). At least one AP included in one ESS (140) may have the same service set identification (hereinafter, SSID).

A portal (150) may serve as a bridge for connecting a WLAN network (IEEE 802.11) with another network (e.g., 802.X).

In a WLAN having a structure as illustrated in (A) of FIG. 1, a network between the APs (110, 130) and a network between APs (110, 130) and STAs (100-1, 105-1, 105-2) may be implemented.

(B) of FIG. 1 is a conceptual diagram illustrating an independent BSS. Referring to (B) of FIG. 1, a WLAN system (15) of (B) of FIG. 1 may perform communication by setting a network between STAs without the APs (110, 130), unlike (A) of FIG. 1. A network that performs communication by setting a network even between STAs without the APs (110, 130) is defined to an ad-hoc network or an independent basic service set (hereinafter, 'BSS').

Referring to (B) of FIG. 1, an IBSS (15) is a BSS operating in an ad-hoc mode. Because the IBSS does not include an AP, there is no centralized management entity. Therefore, in the IBSS (15), STAs (150-1, 150-2, 150-3, 155-4, 155-5) are managed in a distributed manner.

All STAs (150-1, 150-2, 150-3, 155-4, 155-5) of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may be broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

The present embodiment proposes an improved scheme for a signal (or control information field) used for a data field of a PPDU. The signal mentioned in the present embodiment may be applied onto high efficiency PPDU (HE PPDU) according to an IEEE 802.11ax standard. The signal mentioned in the present specification may be HE-SIG-A and/or HE-SIG-B included in the HE PPDU. For example, the HE-SIG-A and the HE-SIG-B may also be respectively represented as SIG-A and SIG-B. However, the signal mentioned in the present specification is not necessarily limited to an HE-SIG-A and/or HE-SIG-B standard and may be applied to control/data fields having various names, which include control information in a wireless communication system transferring user data.

In addition, the HE PPDU of FIG. 2 is an example of a PPDU for multiple users. The HE-SIG-B may be included only when the PPDU is for multiple users. The HE SIG-B may be omitted in a PPDU for a single user.

As illustrated, the HE-PPDU for multiple users (MUs) may include various fields such as legacy-short training field (L-STF), legacy-long training field (L-LTF), legacy-signal (L-SIG), high efficiency-signal A (HE-SIG A), high efficiency-signal-B (HE-SIG B), high efficiency-short training field (HE-STF), high efficiency-long training field (HE-LTF), data field (alternatively, a MAC payload), and packet extension (PE). Each of the fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 3:
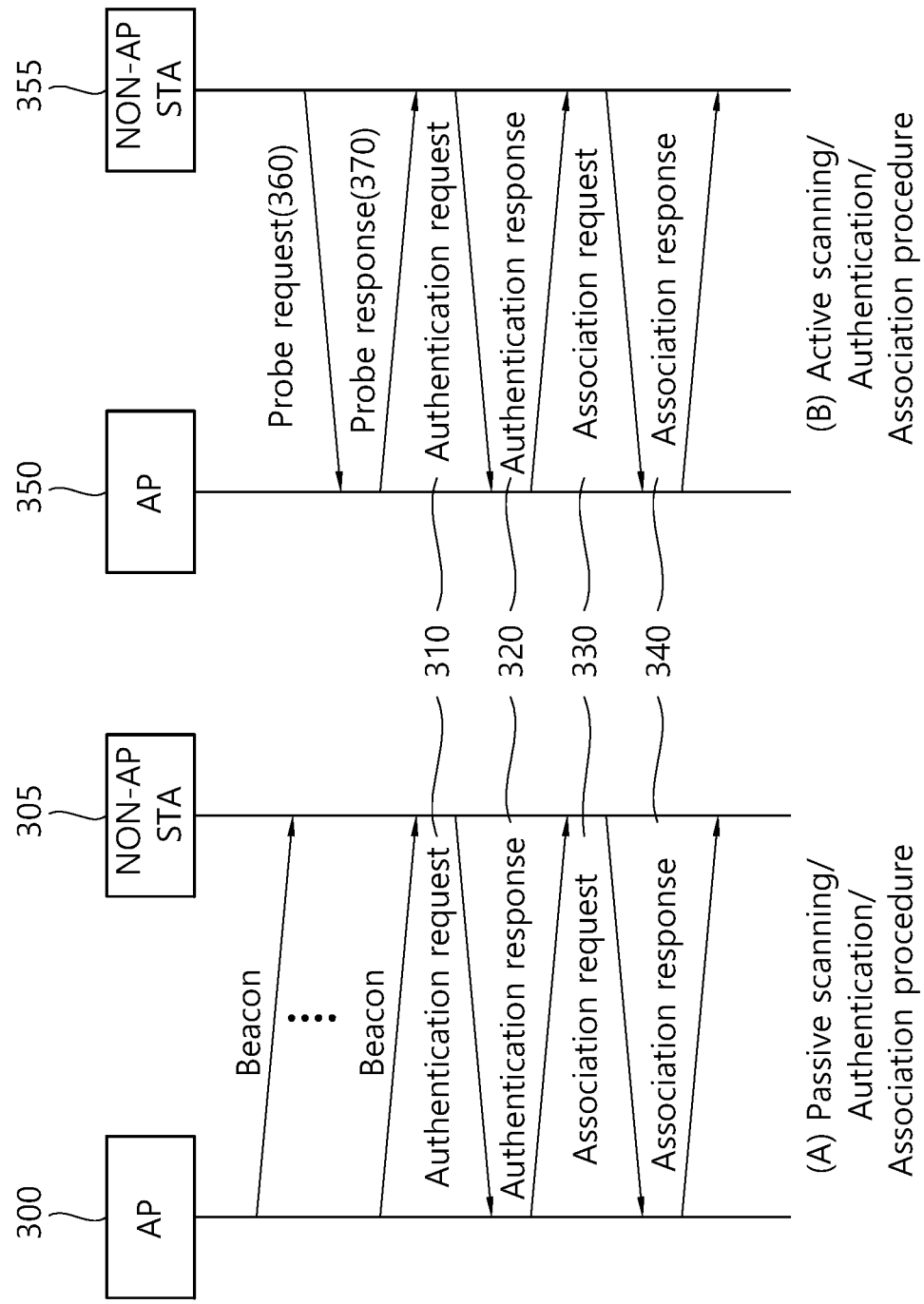
FIG. 3 is a conceptual view illustrating an authentication and association procedure after scanning of an AP and an STA.

FIG. 3 is a conceptual view illustrating an authentication and association procedure after scanning of an AP and an STA.

Referring to FIG. 3, a non-AP STA may perform the authentication and association procedure with respect to one AP among a plurality of APs which have completed a scanning procedure through passive/active scanning. For example, the authentication and association procedure may be performed through 2-way handshaking.

(A) of FIG. 3 is a conceptual view illustrating an authentication and association procedure after passive scanning, and (B) of FIG. 3 is a conceptual view illustrating an authentication and association procedure after active scanning.

The authentication and association procedure may be performed regardless of whether the active scanning or the passive scanning is used. For example, APs (300, 350) exchange an authentication request frame (310), an authentication response frame (320), an association request frame (330), and an association response frame (340) with the non-AP STAs (305, 355) to perform the authentication and association procedure.

More specifically, the authentication procedure may be performed by transmitting the authentication request frame (310) from the non-AP STAs (305, 355) to the APs (300, 350). The APs (300, 350) may transmit the authentication response frame (320) to the non-AP STAs (305, 355) in response to the authentication request frame (310). An authentication frame format is disclosed in IEEE 802.11 8.3.3.11.

More specifically, the association procedure may be performed when the non-AP STAs (305, 355) transmit the association request frame (330) to the APs (300, 305). The APs (300, 350) may transmit the association response frame (340) to the non-AP STAs (305, 355) in response to the association request frame (330).

The association request frame (330) may include information on capability of the non-AP STAs (305, 355). The APs (300, 350) may determine whether the non-AP STAs (305, 355) can be supported based on the information on capability of the non-AP STAs (305, 355) and included in the association request frame (330).

For example, if the support is available, the AP (300, 350) may transmit to the non-AP STAs (305, 355) by allowing the association response frame (340) to contain whether the association request frame (330) is acceptable, its reason, and its supportable capability information. An association frame format is disclosed in IEEE 802.11 8.3.3.5/8.3.3.6.

When up to the association procedure mentioned in FIG. 3 is performed, normal data transmission and reception procedures may be performed between the AP and the STA.

FIG. 4 is an internal block diagram of a wireless user equipment (UE) (or terminal) receiving a wake-up packet.

Referring to FIG. 4, a WLAN system (400) according to the present embodiment may include a first wireless UE (410) and a second wireless UE (420).

The first wireless UE (410) may include a main radio module (411) related to main radio (e.g., 802.11 radio) and a WUR module (412) including low-power wake-up radio (LP WUR). In the present specification, the main radio module may be referred to as a primary component radio (hereinafter, PCR) module. For example, the main radio module (411) may include a plurality of circuits supporting Wi-Fi, Bluetooth® radio (hereinafter, BT radio), and Bluetooth® Low Energy radio (hereinafter, BLE radio).

The WUR module (412) may be implemented by various methods. For example, it is possible to implement the WUR module (412) by using a method of embedding the WUR module (412) in the main radio module (411). That is, it is also possible to include the WUR module (412) in the main radio module (411), as shown in (B) of FIG. 4. Although the main radio module (411) and the WUR module (412) are individually indicated in (A) of FIG. 4, an example of (A) of FIG. 4 indicates that the WUR module (412) is included in the main radio module (411) within a same STA. That is, an example of (A) of FIG. 4 may include an example of (B) of FIG. 4.

In the present specification, the first wireless UE (410) may control the main radio module (411) in an awake state or a doze state.

For example, when the main radio module (411) is in the awake state, the first wireless UE (410) is able to transmit an 802.11-based frame (e.g., 802.11-type PPDU) or receive an 802.11-based frame based on the main radio module (411). For example, the 802.11-based frame may be a non-HT PPDU of a 20 MHz band. The 802.11-based frame may be referred to as various terminologies such as a wireless local area (WLAN) packet.

For another example, when the main radio module (411) is in the doze state, the first wireless UE (410) is not able to transmit the 802.11-based frame (e.g., 802.11-type PPDU) or receive the 802.11-based frame based on the main radio module (411).

That is, when the main radio module (411) is in the doze state (e.g., OFF state), the first wireless UE (410) is not able to receive a frame (e.g., 802.11-type PPDU) transmitted by the second wireless UE (420) (e.g., AP) until the WUR module (412) wakes up the main radio module (411) to transition to the awake state according to a wake-up packet (hereinafter, WUP).

In the present specification, the first wireless UE (410) may control the WUR module (412) in the turn-off state (i.e., WUR off/doze state) or the turn-on state (i.e., WUR on/awake state).

For example, the first wireless UE (410) including the WUR module (412) in the turn-on state is able to receive (or demodulate) only a specific-type frame (i.e., WUR PPDU) transmitted by the second wireless UE (420) (e.g., AP).

In this case, the specific-type frame (e.g., WUR PPDU) may be a frame (e.g., wake-up packet) modulated by an on-off keying (OOK) modulation scheme described below with reference to FIG. 5.

For example, the first wireless UE (410) including the WUR module (412) in the turn-off state (i.e., WUR off/doze state) is not able to receive (or demodulate) a specific-type frame (e.g., WUR PPDU) transmitted by the second wireless UE (420) (e.g., AP).

In the present specification, the first wireless UE (410) can operate a main radio module (i.e., PCR module (411)) and a WUR module (412) independently.

For example, when the main radio module (411) is in the awake state, and when the WUR module (412) is in the turn-off state (i.e., WUR off/doze state), a first wireless UE (410) may be referred to as operating in a WLAN mode. Additionally, for example, when the WUR module (412) is in the turn-off state, the first wireless UE (410) may be referred to as operating in a WUR mode. However, such definition may be modified in the following detailed example.

The first wireless UE (410) being in the WUR mode may receive a wake-up packet (WUP) based on the WUR module (412) being in the turn-on state. Additionally, when the wake-up packet (WUP) is received in the WUR module (412), the wireless UE (410) being in the WUR mode may control the WUR module (412) so as to wake the main radio module (411).

Additionally, when the main radio module (411) is in the doze state, and when the WUR module (412) is in the turn-on state, the first wireless UE (410) may be referred to as operating in the WUR-PS mode.

In the present specification, the terms "awake state" and "turn-on state" may be interchanged in order to indicate an ON state of a specific module included in a wireless UE. In the same context, the terms "doze state" and "turn-off state" may be interchanged in order to indicate an OFF state of a specific module included in a wireless UE.

The first wireless UE (410) according to the present embodiment can receive a frame (e.g., a PPDU based on 802.11) from another wireless UE (420) (e.g., AP) based on the main radio module (411) or the WUR module (412) in an active state.

The WUR module (412) may be a receiver for switching the main radio module (411) in a doze state to an awake state. That is, the WUR module (412) may not include a transmitter.

The first wireless UE (410) may operate the WUR module (412) in a turn-on state for a duration in which the main radio module (411) is in a doze state.

For example, when a WUP is received based on the WUR module (412) in a turn-on state, the first wireless UE (410) can control the main radio module (411) in a doze state such that it switches to an awake state.

For reference, a low power wake-up receiver (LP WUR) included in the WUR module (412) aims at target power consumption of less than 1 mW. Further, the LP WUR may use a narrow bandwidth of less than 5 MHz.

In addition, power consumption of the LP WUR may be less than 1 Mw. Further, a target transmission range of the LP WUR may be the same as that of the legacy 802.11.

The second wireless UE (420) according to the present embodiment can transmit user data based on main radio (i.e., 802.11). The second wireless UE (420) can transmit a WUP for the WUR module (412).

Figure 5:
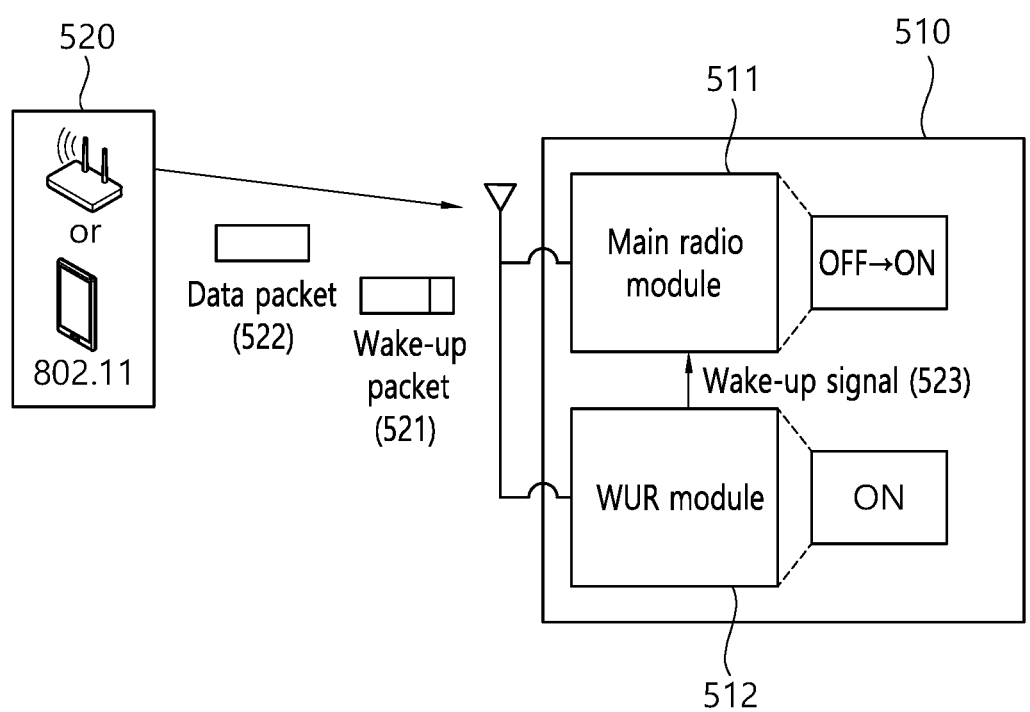
FIG. 5 is a conceptual diagram illustrating a method in which a wireless user equipment (UE) (or terminal) receives a wake-up packet and a data packet.

FIG. 5 is a conceptual diagram illustrating a method in which a wireless user equipment (UE) (or terminal) receives a wake-up packet and a data packet. A wireless UE in FIG. 5 is based on a wireless UE in FIG. 5, and thus each module in FIG. 5 is corresponding to each module in FIG. 4.

Referring to FIG. 4 and FIG. 5, a WLAN system (500) according to the present embodiment may include a first wireless UE (510) corresponding to a receiving UE and a second wireless UE (520) corresponding to a transmitting UE.

A basic operation of the first wireless UE (510) of FIG. 5 may be understood through a description of the first wireless UE (410) of FIG. 4. Similarly, a basic operation of the second wireless UE (520) of FIG. 5 may be understood through a description of the second wireless UE (420) of FIG. 4.

Referring to FIG. 5, the wake-up packet (521) may be received in a WUR module (512) in a turn-on state (e.g., ON state).

In this case, the WUR module (512) may transfer a wake-up signal (523) to a main radio module (511) in a doze state (e.g., OFF state) in order to accurately receive a data packet (522) to be received after the wake-up packet (521). For example, a data packet (522) is a WLAN packet and can be implemented based on various PPDU formats depicted in FIG. 2

For example, the wake-up signal (523) may be implemented based on an internal primitive of the first wireless UE (510).

For example, when the wake-up signal (523) is received in the main radio module (511) in the doze state (e.g., OFF state), the first wireless UE (510) may control the main radio module (511) to transition to the awake state (i.e., ON state).

For example, when the main radio module (511) transitions from the doze state (e.g., OFF state) to the awake state (i.e., ON state), the first wireless UE (510) may activate all or some of a plurality of circuits (not shown) supporting Wi-Fi, BT radio, and BLE radio included in the main radio module (511).

For another example, actual data included the wake-up packet (521) may be directly transferred to a memory block (not shown) of a receiving UE even if the main radio module (511) is in the doze state (e.g., OFF state).

For another example, when an IEEE 802.11 MAC frame is included in the wake-up packet (521), the receiving UE may activate only a MAC processor of the main radio module (511). That is, the receiving UE may maintain a PHY module of the main radio module (511) to be in an inactive state. The wake-up packet (521) of FIG. 5 will be described below in greater detail with reference to the accompanying drawings.

The second wireless UE (520) may be configured to transmit the wake-up packet (521) to the first wireless UE (510).

Figure 6:
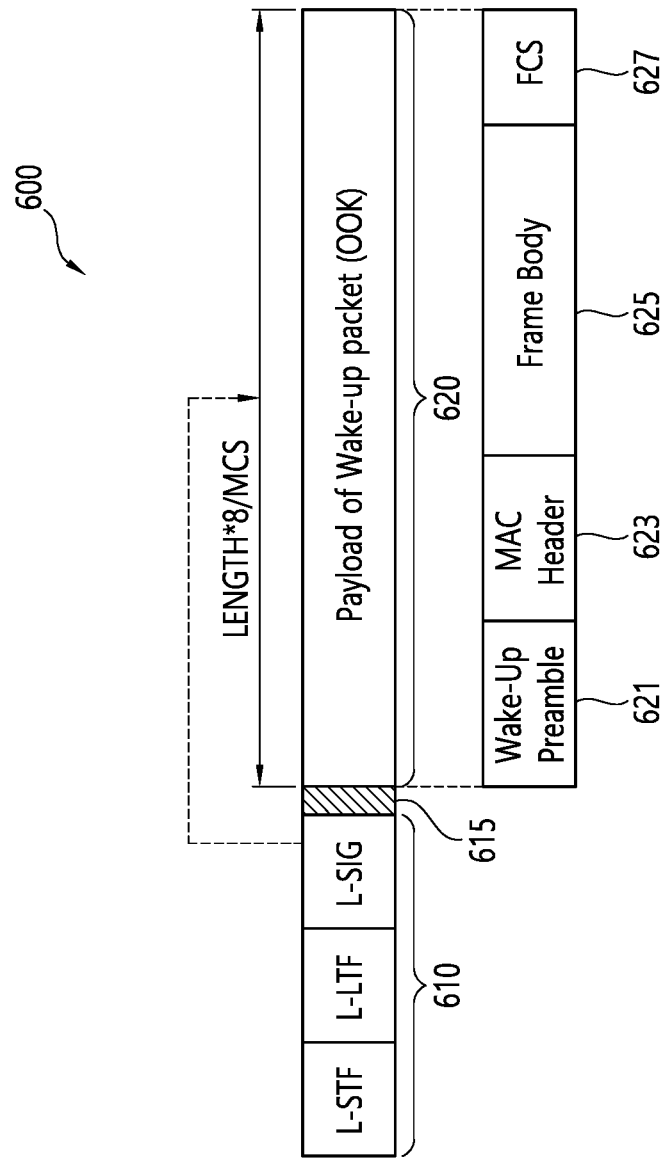
FIG. 6 illustrates an example of a WUR PPDU format.

FIG. 6 illustrates an example of a WUR PPDU format.

Referring to FIGS. 1 to 6, a wake-up packet (600) may include at least one legacy preamble (610). In addition, the wake-up packet (600) may include a payload (620) after the legacy preamble (610). The payload (620) may be modulated by a simple modulation scheme (e.g., On-Off Keying (OOK) modulation scheme). The wake-up packet (600) including a payload may be transmitted based on a relatively small bandwidth.

Referring to FIGS. 1 to 6, the second wireless UE (e.g., 520) may be configured to generate and/or transmit wake-up packets (521, 600). The first wireless UE (e.g., 510) may be configured to process the received wake-up packet (521).

For example, the wake-up packet (600) may include any other preamble (not shown) or a legacy preamble (610) defined in the existing IEEE 802.11 standard. The wake-up packet (600) may include one packet symbol (615) after the legacy preamble (610). Further, the wake-up packet (600) may include a payload (620).

The legacy preamble (610) may be provided for coexistence with a legacy STA. An L-SIG field for protecting a packet may be used in the legacy preamble (610) for the coexistence.

For example, an 802.11 STA may detect a start portion of a packet through the L-STF field in the legacy preamble (610). The STA may detect an end portion of the 802.11 packet through the L-SIG field in the legacy preamble (610).

In order to reduce false alarm of the 802.11n UE (or terminal), one modulated symbol (615) may be added after the L-SIG of FIG. 6. One symbol (615) may be modulated according to a BiPhase Shift Keying (BPSK) scheme. One symbol (615) may have a length of 4 us. One symbol (615) may have a 20 MHz bandwidth as a legacy part.

The legacy preamble (610) may be understood as a field for a third-party legacy STA (STA not including LP-WUR). In other words, the legacy preamble (610) may not be decoded by the LP-WUR.

The payload (620) may include a Wake-Up preamble field (621), a MAC header field (623), a Frame Body field (625), and a Frame Check Sequence (FCS) field (627).

The Wake-Up preamble field (621) may include a sequence for identifying the Wake-Up packet (600). For example, the Wake-Up preamble field (621) may include a Pseudo Random Noise Sequence (PN sequence).

The MAC header field (623) may include Address information (or identifier of a receiving device) receiving the Wake-Up packet (600). The Frame Body field (625) may include other information of the Wake-Up packet (600).

Length information or side information of the payload may be included in the Frame Body field (625). Referring to FIG. 6, the length information of the payload may be calculated based on LENGTH information and MCS information included in the legacy preamble (610).

The FCS field (627) may include a Cyclic Redundancy Check (CRC) value for error correction. For example, the FCS field (627) may include a CRC-8 value or CRC-16 value for the MAC header field (623) and the Frame Body field (625).

Among each of the fields shown in FIG. 6, part of the fields may be omitted. That is, among each of the fields shown in FIG. 6, part of the fields may not be mandatory fields.

Figure 7:
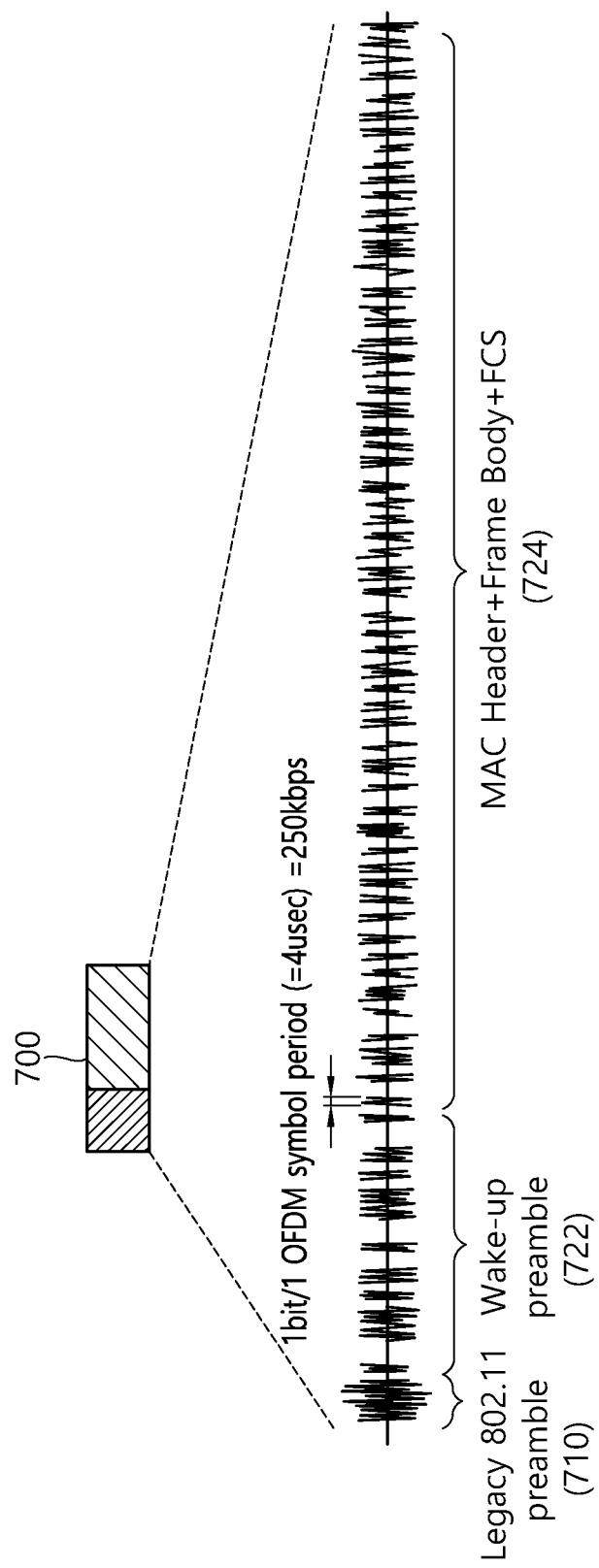
FIG. 7 illustrates a signal waveform of a wake-up packet.

FIG. 7 illustrates a signal waveform of a wake-up packet.

Referring to FIG. 7, a wake-up packet (700) may include a legacy preamble (802.11 preamble) (710) and payloads (722, 724) modulated based on on-off keying (OOK). That is, the wake-up packet (WUP) according to the present embodiment may be understood in a form in which a legacy preamble and a new LP-WUR signal waveform coexist.

OOK may not be applied to the legacy preamble (710) of FIG. 7. As described above, the payloads (722, 724) may be modulated according to the OOK. However, the wake-up preamble (722) included in the payloads (722, 724) may be modulated according to another modulation scheme.

For example, it may be assumed that the legacy preamble (710) is transmitted based on a channel band of 20 MHz to which 64 FFTs are applied. In this case, the payloads (722, 724) may be transmitted based on a channel band of about 4.06 MHz.

Figure 8:
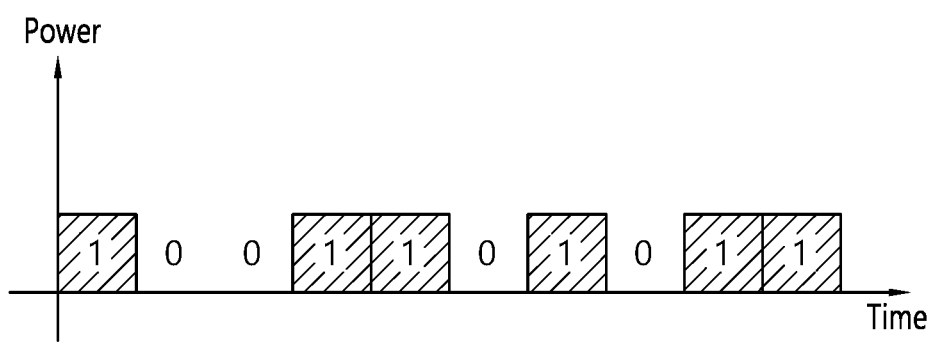
FIG. 8 is a diagram illustrating a procedure in which power consumption is determined according to a ratio of bit values configuring binary sequence information.

FIG. 8 is a diagram illustrating a procedure in which power consumption is determined according to a ratio of bit values configuring binary sequence information.

Referring to FIG. 8, binary sequence information having '1' or '0' as a bit value may be expressed. Communication according to the OOK modulation scheme may be performed based on a bit value of the binary sequence information.

For example, when a light emitting diode is used for visible light communication, if the bit value constituting binary sequence information is '1', the light emitting diode may be turned on, and if the bit value is '0', the light emitting diode may be turned off.

As the receiving device receives and restores data transmitted in the form of visible light according to flickering of the light emitting diode, communication using visible light is enabled. However, because the human eye cannot recognize flickering of the light emitting diode, the person feels that the lighting is continuously maintained.

For convenience of description, as shown in FIG. 8, binary sequence information having 10-bit values may be provided. For example, binary sequence information having a value of '1001101011' may be provided.

As described above, when the bit value is '1', the transmitting UE is turned on, and when the bit value is '0', the transmitting UE is turned off, and thus symbols corresponding to 6-bit values of the above 10-bit values are turned on.

Because the wake-up receiver WUR according to the present embodiment is included in the receiving UE, transmission power of the transmitting UE may not be largely considered. The reason why the OOK is used in this embodiment is that power consumed in a decoding process of the received signal is very small.

Until the decoding procedure is performed, there may be no significant difference between power consumed by the main radio and power consumed by the WUR. However, as a decoding procedure is performed by the receiving UE, a large difference may occur between power consumed in the main radio module and power consumed in the WUR module. Below is approximate power consumption.

Existing Wi-Fi power consumption is about 100 mW. Specifically, power consumption of Resonator+Oscillator+PLL (1500 uW)→LPF (300 uW)→ADC (63 uW)→decoding processing (Orthogonal frequency-division multiplexing (OFDM) receiver) (100 mW) may occur.

However, WUR power consumption is about 1 mW. Specifically, power consumption of Resonator+Oscillator (600 uW)→LPF (300 uW)→ADC (20 uW)→decoding processing (Envelope detector) (1 uW) may occur.

Figure 9:
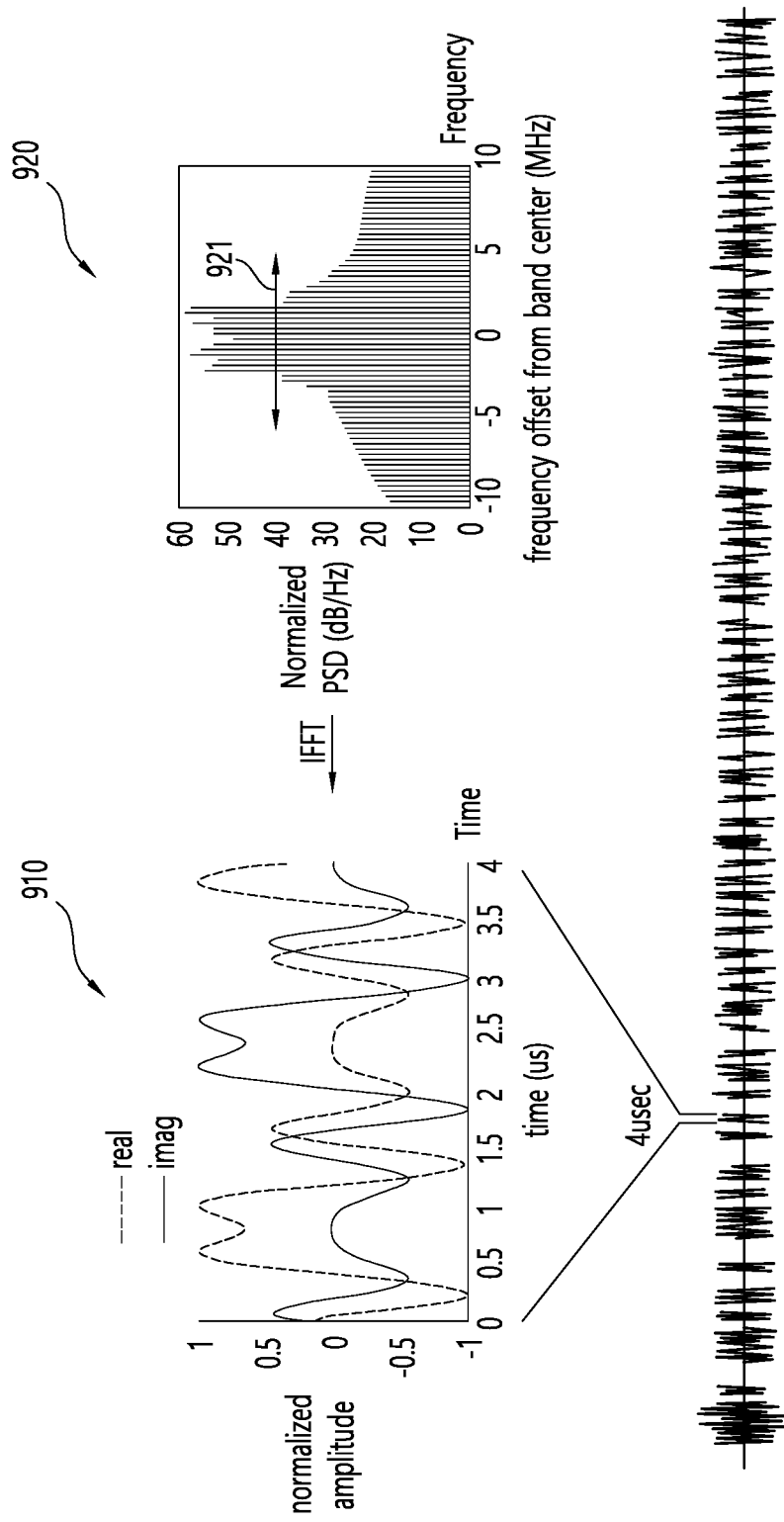
FIG. 9 is a diagram illustrating a design process of a pulse according to OOK.

FIG. 9 is a diagram illustrating a design process of a pulse according to OOK.

A wireless UE (or terminal) according to the present embodiment may use an existing orthogonal frequency-division multiplexing (OFDM) transmitter of 802.11 in order to generate pulses according to OOK. The existing 802.11 OFDM transmitter may generate a 64-bit sequence by applying 64-point IFFT.

Referring to FIG. 1 to FIG. 9, the wireless UE according to the present embodiment may transmit a payload of a modulated wake-up packet (WUP) according to OOK. The payload (e.g., 620 of FIG. 6) according to the present embodiment may be implemented based on an ON-signal and an OFF-signal.

The OOK may be applied for the ON-signal included in the payload (e.g., 620 of FIG. 6) of the WUP. In this case, the ON-signal may be a signal having an actual power value.

With reference to a frequency domain graph (920), an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the wake-up packet WUP may be 20 MHz. The N1 number of subcarriers may be 64 subcarriers, and the N2 number of subcarriers may be 13 consecutive subcarriers (921 in FIG. 9). A subcarrier interval applied to the wake-up packet WUP may be 312.5 kHz.

The OOK may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set (921) of FIG. 9. In this case, the preset sequence may be a 13-bit sequence. For example, a coefficient corresponding to the DC subcarrier in the 13-bit sequence may be '0', and the remaining coefficients may be set to '1' or '−1'.

With reference to the frequency domain graph (920), the subcarrier set (921) may correspond to a subcarrier whose subcarrier indices are '−6' to '+6'.

For example, a coefficient corresponding to a subcarrier whose subcarrier indices are '−6' to '−1' in the 13-bit sequence may be set to '1' or '−1'. A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set (921) corresponding to consecutive 13 subcarriers may be set to have a channel bandwidth of about 4.06 MHz. That is, power by signals may be concentrated at 4.06 MHz in the 20 MHz band for the wake-up packet (WUP).

According to the present embodiment, when a pulse according to the OOK is used, power is concentrated in a specific band and, thus, there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless UE may be reduced.

An OFDM transmitter of 802.11 according to the present embodiment may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain. One-bit information corresponding to one ON-signal may be transferred through one symbol.

For example, when a 64-point IFFT is performed, a symbol having a length of 3.2 us corresponding to a subcarrier set (921) may be generated. Further, when a cyclic prefix (CP, 0.8 us) is added to a symbol having a length of 3.2 us corresponding to the subcarrier set (921), one symbol having a total length of 4 us may be generated, as in the time domain graph (910) of FIG. 9.

Further, the OFDM transmitter of 802.11 may not transmit an OFF-signal.

According to the present embodiment, a first wireless UE (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0').

Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33-floor (K/2): 33+ceil (K/2)−1.

In this case, the information 1 and the information 0 may have the following values.

Information 0=zeros (1, K)
Information 1=alpha*ones (1, K)

The alpha is a power normalization factor and may be, for example, 1/sqrt (K).

Figure 10:
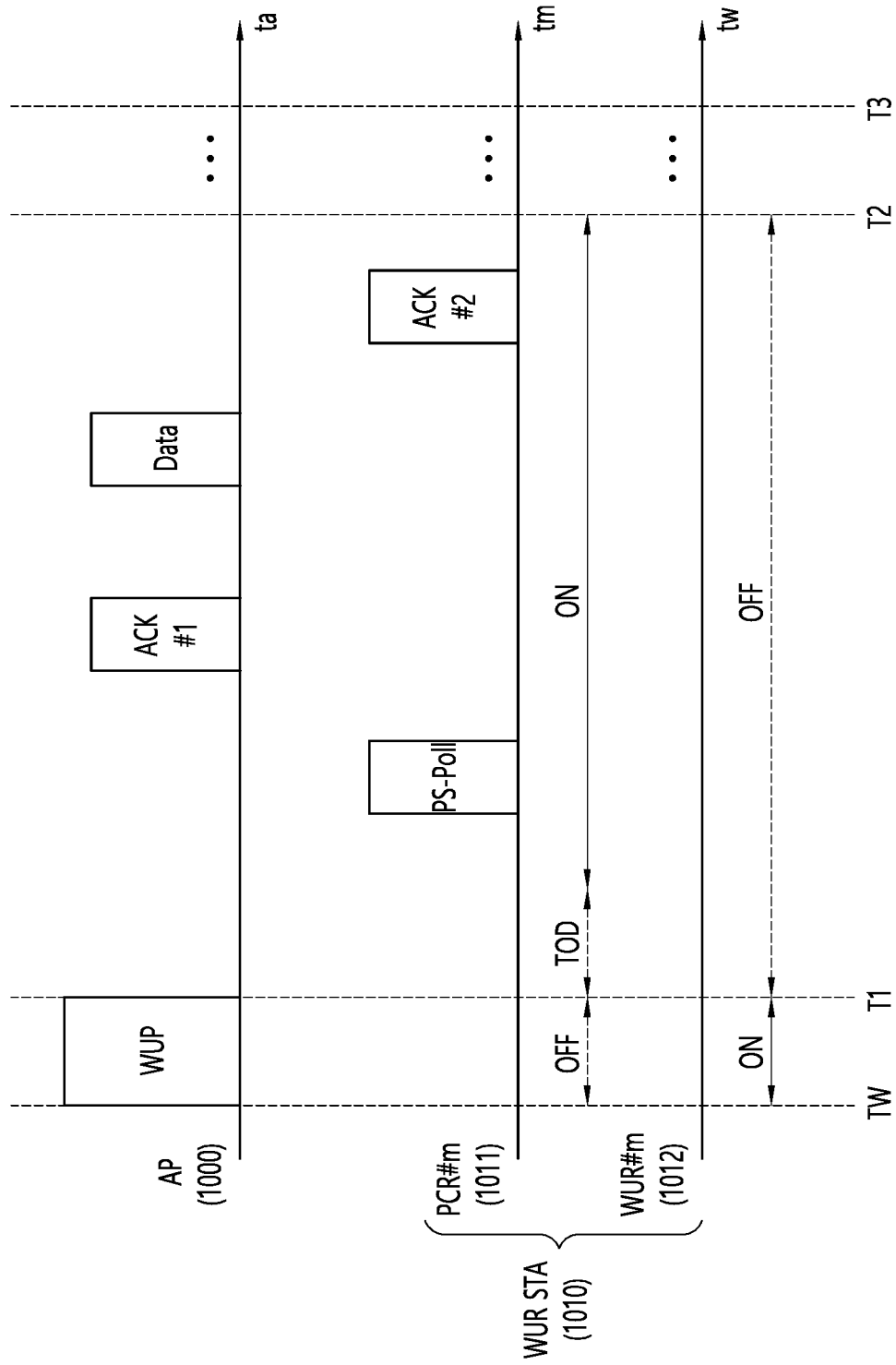
FIG. 10 illustrates a basic operation for a WUR STA.

FIG. 10 illustrates a basic operation for a WUR STA.

For example, an AP (1000) of FIG. 10 may be based on the second wireless UE (520) of FIG. 5. A horizontal axis of the AP (1000) of FIG. 10 may indicate time (ta). A vertical axis of the AP (1000) of FIG. 10 may be associated with the presence of a packet (or frame) that is to be transmitted by the AP (1000) of FIG. 10.

For example, a WUR STA (1010) of FIG. 10 may be based on the first wireless UE (510) of FIG. 5. The WUR STA (1010) may include a main radio module (PCR #m, 1011) and a WUR module (PCR #m, 1012). The main radio module (1011) of FIG. 10 may correspond to the main radio module (511) of FIG. 5.

More specifically, the main radio module (1011) may support both receiving operations for receiving an 802.11-based packet (i.e., wireless LAN packet/signal) from the AP (1000) and transmitting operations for transmitting an 802.11-based packet to the AP (1000). For example, the 802.11-based packet may be a packet modulated in accordance with the OFDM scheme.

A horizontal axis of the main radio module (1011) of FIG. 10 may indicate time (tm). Arrows marked below the horizontal axis of the main radio module (1011) may be associated with a power status (e.g., ON state or OFF state) of the main radio module (1011). A vertical axis of the main radio module (1011) may be associated with the presence of a packet that is to be transmitted based on the main radio module (1011).

A WUR module (1012) of FIG. 10 may correspond to the WUR module (512) of FIG. 5. More specifically, the WUR module (1012) may support only receiving operations for receiving a packet modulated in accordance with the ON-OFF Keying (OOK) scheme from the AP (1000).

A horizontal axis (tw) of the WUR module (1012) may indicate time (tw). Additionally, arrows marked below the horizontal axis of the WUR module (1012) may be associated with a power status (e.g., WUR ON state or WUR OFF/doze state) of the WUR module (1012).

The WUR STA (1010) of FIG. 10 may be understood as a wireless UE that is associated with the AP (1000) by performing an association procedure.

Referring to FIG. 5 and FIG. 10, the AP (1000) of FIG. 10 may correspond to the second wireless UE (520) of FIG. 5. A horizontal axis of the AP (1000) of FIG. 10 may indicate time (ta). A vertical axis of the AP (1000) of FIG. 10 may be associated with the presence of a packet (or frame) that is to be transmitted by the AP (1000).

The WUR STA (1010) may correspond to the first wireless UE (510) of FIG. 5. The WUR STA (1010) may include the main radio module (PCR #m, 1011) and the WUR module (PCR #m, 1012). The main radio module (1011) of FIG. 10 may correspond to the main radio module (511) of FIG. 5.

More specifically, the main radio module (1011) may support both receiving operations for receiving an 802.11-based packet from the AP (1000) and transmitting operations for transmitting an 802.11-based packet to the AP (1000). For example, the 802.11-based packet may be a packet modulated in accordance with the OFDM scheme.

A horizontal axis of the main radio module (1011) may indicate time (tm). Arrows marked below the horizontal axis of the main radio module (1011) may be associated with the power status (e.g., ON state or OFF state) of the main radio module (1011).

A vertical axis of the main radio module (1011) may be associated with the presence of a packet that is to be transmitted based on the main radio module (1011). The WUR module (1012) of FIG. 10 may correspond to the WUR module (512) of FIG. 5. More specifically, the WUR module (1012) may support receiving operations for receiving a packet modulated in accordance with the OOK scheme from the AP (1000).

A horizontal axis (tw) of the WUR module (1012) may indicate time (tw). Additionally, arrows marked below the horizontal axis of the WUR module (1012) may be associated with a power status (e.g., WUR ON state or WUR OFF/doze state) of the WUR module (1012).

In a Wake-Up period (TW~T1) of FIG. 10, the WUR STA (1010) may be in the WUR mode.

For example, the WUR STA (1010) may control the main radio module (1011) so that the main radio module (1011) can be in the doze state (i.e., OFF state). Additionally, the WUR STA (1010) may control the WUR module (1012) so that the WUR module (1012) can be in the turn-on state (i.e., ON state).

When a data packet for the WUR STA (1010) exists within the AP (1000), the AP (1000) may transmit a Wake-Up packet (WUP) to the WUR STA (1010) based on contention.

In this case, the WUR STA (1010) may receive the Wake-Up packet (WUP) based on the WUR module (1012) being in the turn-on state (i.e., ON state). Herein, the Wake-Up packet (WUP) may be understood based on the description mentioned above with reference to FIG. 5 to FIG. 7.

In a first period (T1~T2) of FIG. 10, a wake-up signal (e.g., 523 of FIG. 5) for waking the main radio module (511) in accordance with the Wake-Up packet (WUP) received in the WUR module (1012) may be transported to the main radio module (511).

In this specification, a time consumed for the main radio module (511) to transition from the doze state to the awake state in accordance with the wake-up signal (e.g., 523 of FIG. 5) may be referred to as a Turn-On Delay (hereinafter referred to as 'TOD').

Referring to FIG. 10, if the Turn-On Delay (TOD) is elapsed, the WUR STA (1010) may be in the WLAN mode.

For example, if the Turn-On Delay (TOD) is elapsed, the WUR STA (1010) may control the main radio module (1011) so that the main radio module (1011) can be in the awake state (i.e., ON state). For example, if the wake-up period (TW~T1) is elapsed, the WUR STA (1010) may control the WUR module (1012) so that the WUR module (1012) can be in the turn-off state (i.e., WUR OFF/doze state).

Subsequently, the WUR STA (1010) may transmit a Power Save Poll (hereinafter referred to as 'PS-poll') frame to the AP (1000) based on the main radio module (1011), which is in the awake state (i.e., ON state).

Herein, the PS-poll frame may be a frame for notifying that the WUR STA (1010) is capable of receiving a data packet for the WUR STA (1010), which exists within the AP (1000), based on the main radio module (1011). Additionally, the PS-poll frame may be a frame being transmitted based on a contention with another wireless UE (not shown).

Thereafter, the AP (1000) may transmit a first ACK frame (ACK #1) to the WUR STA (1010) as a response to the PS-Poll frame.

Afterwards, the AP (1000) may transmit a data packet for the WUR STA (1010) to the WUR STA (1010). In this case, the data packet (Data) for the WUR STA (1010) may be received based on the main radio module (1011), which is in the awake state (i.e., ON state).

Subsequently, the WUR STA (1010) may transmit a second ACK frame (ACK #2) for notifying a successful reception of the data packet (Data) for the WUR STA (1010) to the AP (1000).

Although it is not shown in FIG. 10, in a second period (T2~T3) of FIG. 10, the WUR STA (1010) may be transitioned from the WLAN mode back to the WUR mode in order to perform power saving.

Figure 11:
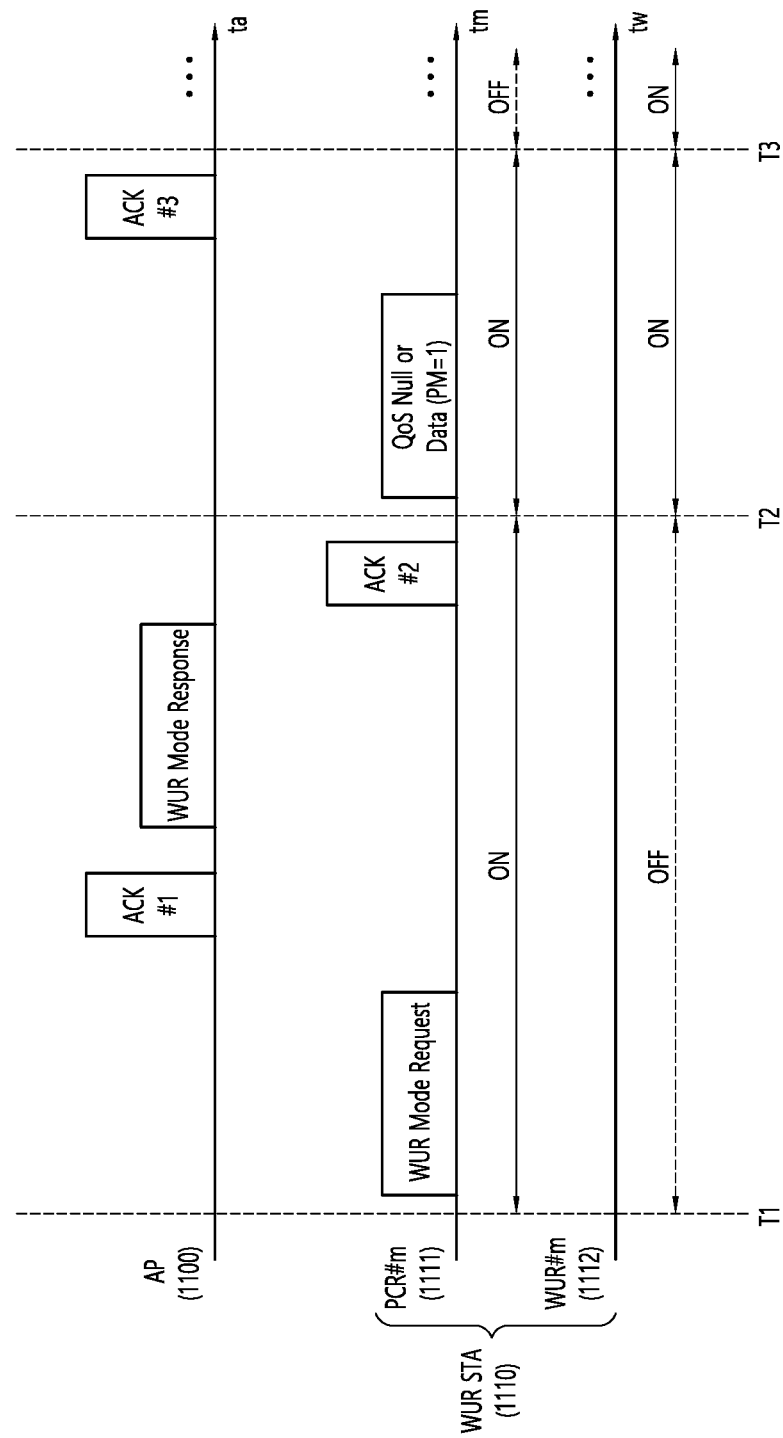
FIG. 11 is a diagram illustrating a signaling procedure for a WUR module according to an embodiment of the present disclosure.

FIG. 11 is a diagram illustrating a signaling procedure for a WUR module according to an embodiment of the present disclosure.

Referring to FIG. 10 and FIG. 11, an AP (1100) of FIG. 11 may correspond to the AP (1000) of FIG. 10, and a WUR STA (1110) of FIG. 11 may correspond to the WUR STA (1010) of FIG. 10. Additionally, a main radio module (1111) of FIG. 11 may correspond to the main radio module (1011) of FIG. 10, and a WUR module (1112) of FIG. 11 may correspond to the WUR module (1012) of FIG. 10.

For a clear and concise understanding of FIG. 11, the WUR STA (1110) may be understood as a wireless UE that is associated with the AP (1100) by performing an association procedure.

The AP (1100) of FIG. 11 shall know in advance the operation mode of the WUR STA (1100) in order to be capable of efficiently transmitting downlink data for the WUR STA (1110). That is, each time the WUR STA (1110) intends to modify its operation mode, the WUR STA (1110) needs to notify such intention to the AP (1100).

In a first period (T1~T2) of FIG. 11, the WUR STA (1110) may be in the WLAN mode. For example, the WUR STA (1110) may control the main radio module (1111) so that the main radio module (1111) can be in the awake state (i.e., ON state). Additionally, the WUR STA (1110) may control the WUR module (1112) so that the WUR module (1112) can be in the turn-off state (i.e., WUR OFF/doze state).

In this case, when the WUR STA (1110) intends to enter its operation mode to the WUR mode from the WLAN mode, the WUR STA (1110) may transmit a WUR module request frame of the WUR STA (1110) to the AP (1100).

For example, the WUR module request frame may include mode indication information for an operation mode requested by the WUR STA (1110). For example, the mode indication information may be configured of a first value, which notifies that the WUR STA (1110) intends to enter the WUR mode, or a second value, which notifies that the WUR STA (1110) intends to suspend the WUR mode.

Herein, the WUR mode request frame may be understood as a request frame including mode indication information configured of the first value, which notifies that the intention to enter the WUR mode For example, the WUR mode request frame may further include parameter information for Duty Cycle operation by the WUR module (1112).

Herein, the parameter information for Duty Cycle operation may include information on an ON duration that is preferred by the WUR module (1112). For example, the ON duration information may indicate a length of a time during which the WUR module (1112) maintains the awake state (i.e., WUR ON/awake state).

Additionally, the parameter information for a Duty Cycle operation may further include information on a Duty Cycle Period, which is a time between ON durations of each WUR Duty Cycle.

As another example, the WUR mode request frame may further include information on a Timeout value for a Wake-up packet. For example, in case a response is failed to be made during a predetermined time after receiving the Wake-Up packet (WUP), the WUR STA (1110) may need to operate once again in the WUR mode in order to receive a Wake-Up packet (WUP) that is to be retransmitted.

As yet another example, the WUR mode request frame may further include information on Received RSSI and Channel quality information. For example, in order to help the AP determine a transmission rate of a Wake-Up packet (WUP), the WUR STA (1110) may transmit a measurement value of a frame, which was received from the AP (1100).

Subsequently, the WUR STA (1110) may receive a first ACK frame, which notifies a successful reception of a WUR mode request frame, based on the main radio module (1111).

Thereafter, the WUR STA (1110) may receive a WUR mode response frame, as a response to the WUR mode request frame, from the AP (1100) based on the main radio module (1111). Herein, the WUR mode response frame may include WUR-related information that is granted by the AP (1100) based on requests on mode modification (or change) of the WUR STA (1110).

For example, the WUR-related information may include Status code information granting or rejecting (or denying) a request on mode modifications of the WUR STA (1110).

For example, if the AP (1100) determines that the AP (1100) that can support the WUR mode of the WUR station (1110) based on the WUR mode request frame, Grant information may be included in the Status code information.

As another example, if the AP (1100) determines that the AP (1100) that cannot support the WUR mode of the WUR STA (1110) based on the WUR mode request frame, Rejection information may be included in the Status code information together with a rejection reason.

For example, WUR Identifier (hereinafter referred to as 'WUR ID') allocation information may be included in the WUR-related information for the WUR STA (1110) that is determined by the AP (1100). In this case, the WUR ID allocation information may be identification information for unicast or identification information for group-unit multicast or broadcast.

For example, parameter information for a Duty Cycle operation, which is determined by the AP (1100) based on the WUR mode request frame, may be included in the WUR-related information.

Herein, information on a starting point of the Duty Cycle operation, which is determined by the AP (1100), may be included in the parameter information for a Duty Cycle operation, which is determined by the AP (1100).

As another example, information on a WUR channel that is to be used for the WUR mode, which is determined by the AP (1100) based on the WUR mode request frame, may be included in the WUR-related information.

As yet another example, information on a transmission rate of a Wake-Up packet (WUP) of a unicast method, which is determined by the AP (1100) based on the WUR mode request frame, may be included in the WUR-related information.

As yet another example, information on a timestamp for performing synchronization with the WUR STA (1110) before operating in the WUR mode may be included in the WUR-related information.

As yet another example, the WUR-related information may include information on a WUR beacon frame so as to allow the WUR STA (1110) to normally receive a WUR beacon while operating in the WUR mode.

Subsequently, after transmitting a second ACK frame notifying the successful reception of the WUR mode response frame, the WUR STA (1110) may operate in the WUR mode based on the WUR-related information.

In a second period (T2~T3) of FIG. 11, the WUR STA (1110) may transmit a QoS null frame or a data frame having a Power Management (hereinafter referred to as 'PM') field set to '1', to the AP (1100), based on the main radio module (1111).

Thereafter, the WUR STA (1110) may receive, from the AP (1100), a third ACK frame, which notifies the successful reception of the QoS null frame or data frame, based on the main radio module (1111).

If the third ACK frame is received, the WUR STA (1110) may control the main radio module (1111) so that the main radio module (1111) can transition from the awake state (i.e., ON state) to the doze state (i.e., OFF state) for power saving.

After a third time point (T3) of FIG. 11, the WUR STA (1110) may operate in the WUR-PS mode. For example, the WUR STA (1110) may control the main radio module (1111) so that the main radio module (1111) can be in the doze state. Additionally, the WUR STA (1110) may control the WUR module (1112) so that the WUR module (1112) can be in the turn-on state.

Figure 12:
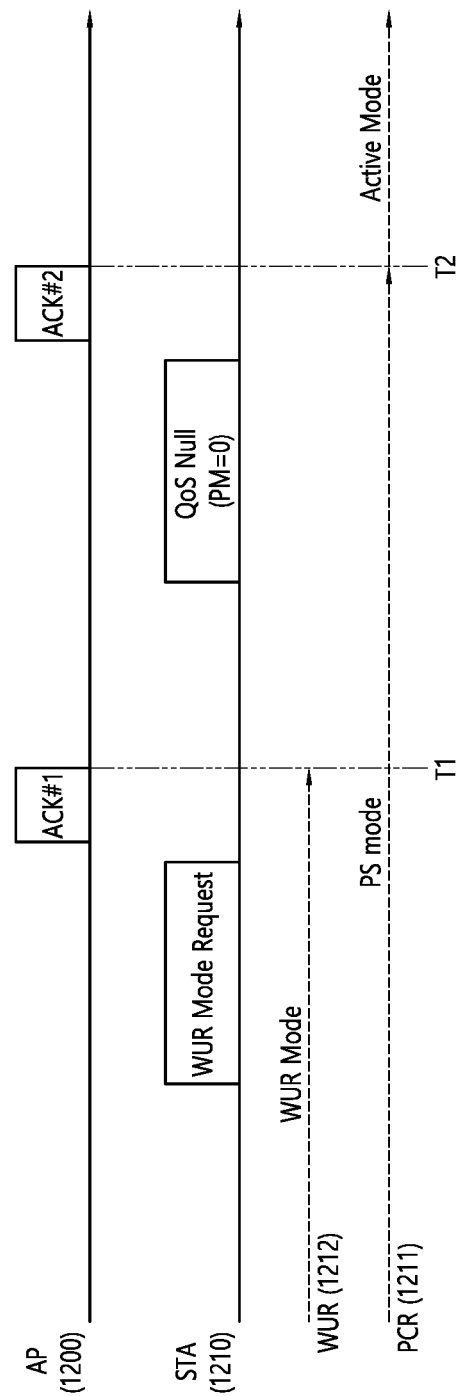
FIG. 12 is a diagram showing an exemplary operation ending a WUR mode.

FIG. 12 is a diagram showing an exemplary operation ending a WUR mode.

A WUR STA (1210) shown in FIG. 12 may enter the WUR mode in accordance with the procedure of FIG. 11. The WUR STA (1210) and the AP (1200) shown in FIG. 12 may correspond to entities shown in FIG. 10 to FIG. 11.

In the WUR mode, a WUR module (1212) of the WUR STA (1210) may operate in one of the WUR on/awake state and the WUR off state (i.e., WUR doze state). Additionally, as described above, the length of the WUR on/off state may be configured in accordance with the above-described Duty Cycle.

In the example of FIG. 12, the WUR STA (1210) may transmit a WUR Mode request to the AP (1200) in order to end the WUR mode. That is, the WUR STA (1210) may request an end of the WUR mode through a specific field within the WUR mode request. The AP (1210) may receive a WUR Mode request and may transmit an ACK (i.e., ACK #1 shown in the drawing) to the request.

The WUR STA (1210) may end the WUR mode immediately after receiving ACK #1. That is, even if an additional WUR Mode response is not received from the AP, it is possible to end the WUR mode after receiving ACK #1. That is, after time point T1 shown in FIG. 12, the WUR module (1212) of the WUR STA (1210) may end the WUR mode.

Afterwards, the WUR STA (1210) transmits a QoS null frame having its PM bit set to "0" or transmits another type of response frame (e.g., a MAC frame having its PM bit set to "0"), and, then, after receiving an ACK (i.e., ACK #2) for the QoS null frame, the WUR STA (1210) may end its previous power save (PS) mode and may enter an active mode. A PCR module (1211) of FIG. 12 maintains the PS mode having its awake/doze state optionally set up to T2, and, then, starting from time point T2, the PCR module (1211) may end the PS mode and may operate in the active mode. A general Wi-Fi STA, i.e., PCR module may operate in the active mode or PS mode. In the active mode, although the signal transmission and/or reception occurs consecutively, in the PS mode, the ON state (i.e., awake state) and the OFF state (i.e., doze state) may be repeated.

In case of being configured for WUR STA, this specification proposes specific operations of a WUR STA. More specifically, there may occur a case where an WUR STA and/or AP shall change (or modify) parameters related to the WUR mode. This specification proposes an enhanced method/device changing (or modifying) parameters related to the WUR mode.

Even if the WUR STA operates normally in the WUR mode, there may occur a case where the parameters related to the WUR mode (hereinafter referred to as "WUR parameter" or "WUR operation parameter") must be changing/updated. Examples of a situation where the WUR parameters are being updated are as described below.

Example 1—a Situation where an Id (Unicast Id and/or Group Id) of the WUR STA is Changed For example, when the AP assigns (or allocates) a new ID to the corresponding WUR STA and transmits a multicast WUP or FDMA WUP, a specific STA may be changed to another group. Due to such change, the WUR parameters may be updated.

Example 2—a Situation where a WUR Channel is Changed

For example, a channel may be changed in case the performance of a WUR operation channel (i.e., frequency channel on which a WUR module operates) of the corresponding user equipment (UE) is very poor, or in case a PCR channel (i.e., frequency channel on which a PCR module operates) is changed, or in case a group of the UE changes when WUR UEs are grouped to a specific channel.

Example 3—a Situation where a WUR Duty Cycle is Changed

For example, a WUR Duty cycle parameter may be changed. More specifically, by changing a parameter related to a Duty cycle of the UE, a starting time or ON/OFF duration length of the Duty cycle may be changed.

This specification will not be limited only to the above-described detailed examples. And, therefore, in case the WUR parameters are updated in accordance with various situations, the following examples may be applied.

A method for updating WUR parameters may be variously proposed as follows.

Method 1—For example, a method for ending the WUR mode and newly starting a WUR mode by using the changed (or modified) WUR operation parameter may be proposed.

Method 2—A method for receiving changed (or modified) content of a WUR operation parameter, from a PCR, without ending the WUR mode may be proposed.

Method 3—A method for receiving changed (or modified) content of a WUR operation parameter, via WUR, without ending the WUR mode may be proposed.

However, since a UE and AP shall newly repeat WUR mode signaling, and since operations for managing such repeated signaling are also performed in the UE and AP, it will not be preferable to use Method 1. Also, since the size of the changed content of the WUR operation parameter is too large to be included in a WUR frame, it will not be preferable to use Method 3.

Therefore, the following method may be operated based on Method 2. More specifically, the following example proposes a method for receiving, by an STA, a management frame (i.e., MAC frame) including the changed content of the WUR operation parameter, during a process of being operated in the WUR mode, without ending the WUR mode, and for decoding, by a PCR module, the management frame including the changed content. The management frame proposed in this specification may be referred to as various terms (e.g., control frame). And, in the following example, the proposed management frame may be referred to as a "WUR Parameter Change frame" or "WPC frame".

Figure 13:
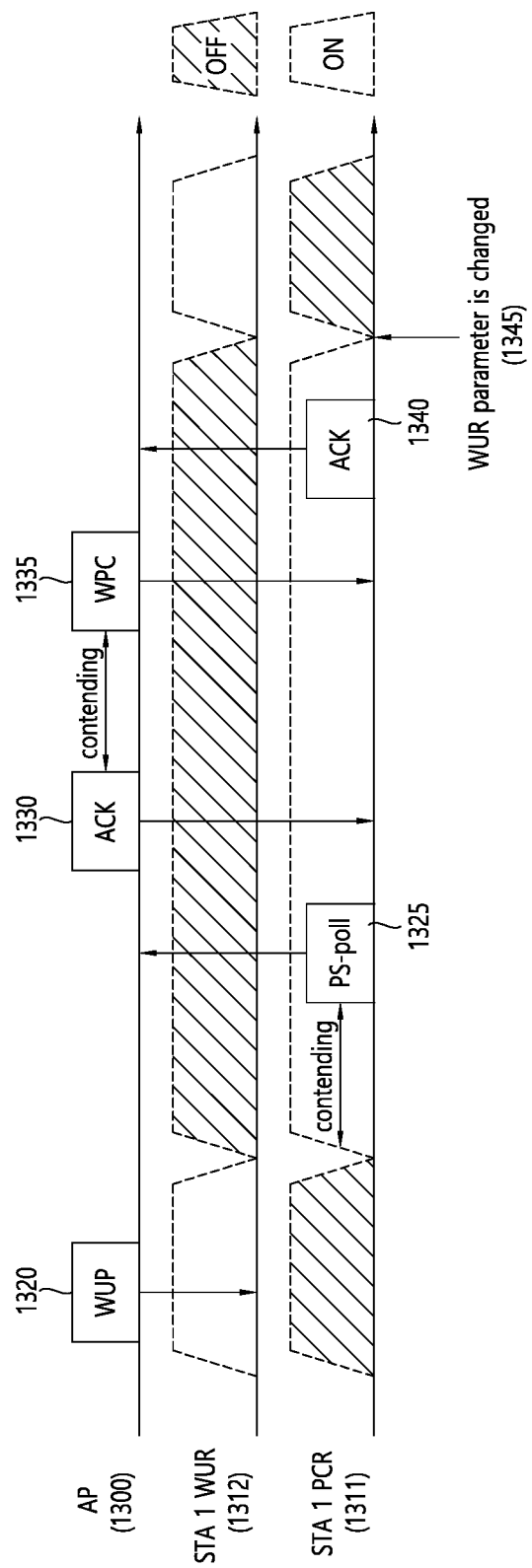
FIG. 13 illustrates a procedure for updating WUR parameters according to an example of this specification.

FIG. 13 illustrates a procedure for updating WUR parameters according to an example of this specification. The operations of FIG. 13 are operations being applied to a WUR STA, which operates in the WUR mode. That is, the operations of FIG. 13 may mean operations after the WUR STA has entered the WUR mode based on the example of FIG. 11, and so on. Additionally, the operations of FIG. 13 may mean operations before ending the WUR mode based on the example of FIG. 12, and so on.

As shown in the drawing, a WUR STA operating in the WUR mode may receive a WUP (1320) in a WUR on/awake state. As described above in FIG. 10, and so on, a PCR module (1311) of the WUR STA having received the WUP (1320) may enter the awake state and, the AP may receive a PS-Poll frame (1325). During this process, as shown in the drawing, a contending operation may also be performed. Additionally, in case the PS-poll frame (1325) is transported to the AP, as described above in FIG. 10, and so on, an ACK (1330) for the PS-poll frame (1325) may be transmitted.

In the example of FIG. 13, an operation of updating the WUR parameter at a time point after the transmission of the ACK (1330) is performed. The AP (1300) does not end the WUR mode in order to update the WUR parameter and transmits a WPC frame (1335). A detailed example of the WPC frame (1335) will be further described with reference to the drawing that follows. The WPC frame (1335) may be configured to be unrelated to a request made by the STA. That is, it will be preferable that the WPC frame (1335) is an unsolicited frame/message and not a response message for a request frame received from the STA.

In case the WPC frame (1335) is received by the STA, it will be preferable that the WPC frame (1335) is decoded by the PCR module (1331) of the WUR STA. Thereafter, the WUR STA transmits an ACK (1340) for the WPC frame (1335) to the AP (1300). Since the STA and AP may verify that the WPC frame has been normally transported through the ACK (1340), a WUR parameter being included in the WPC frame may be applied starting from a point where the ACK (1340) is received. The WUR parameter being included in the WPC frame will be further described with reference to the drawing that follows.

Figure 14:
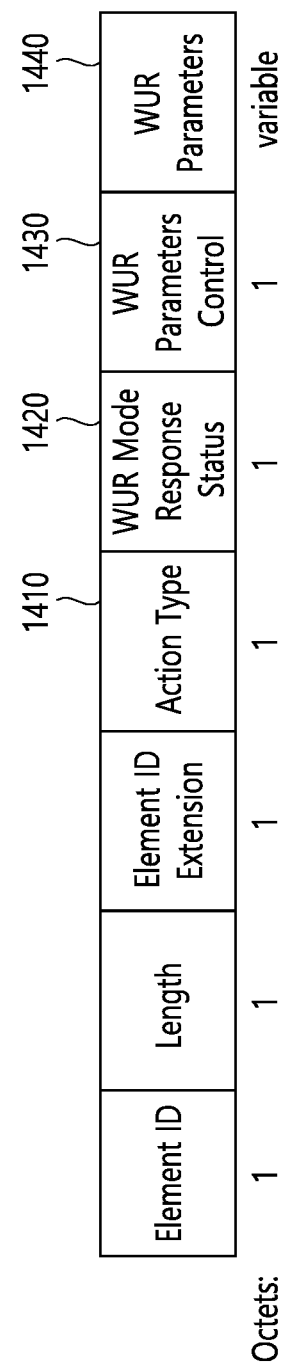
FIG. 14 illustrates an example of detailed information included in a WPC frame.

FIG. 14 illustrates an example of detailed information included in a WPC frame.

A WPC frame according to this specification includes a MAC frame, and the corresponding MAC frame may include fields of FIG. 14. And, the fields of FIG. 14 may be referred to as WUR Mode elements.

The fields of FIG. 14 may include of Element ID, Length, Element ID Extension fields of the related art. Additionally, a field of FIG. 14 may include an Action Type field (1410). The Action Type field (1410) may, for example, be configured of 8 bits, and specific values of this field may be equal to the values shown in FIG. 15.

FIG. 15 illustrates an example of an Action Type included in a WPC frame.

Referring to FIG. 14 and FIG. 15, in case the STA requests entering the WUR mode, the Action Type value may be equal to "0". In case a response of the AP to the STA's request is transmitted, the Action Type value may be equal to "1". In case suspension of the WUR mode is requested, the Action Type value may be equal to "2". And, a response to the Suspend Request may be equal to "3". In case of entering a state where the WUR mode is suspended, the Action Type value may be equal to "4". And, in case of entering the WUR mode, the Action Type value may be equal to "5".

Although the fields of FIG. 14 are also included in the WPC frame, it will be preferable that the fields are equally used in a case where entering the WUR mode is requested/responded, or in a case where suspending the WUR mode is requested/responded, and so on. For this, in case the fields of FIG. 14 are used for the WPC frame, i.e., in case the AP updates the WUR parameters, an appropriate Action Type shall be included.

That is, in case the AP updates the WUR parameters, it will be preferable to include a preconfigured Action Type value to a field (1410) of FIG. 14. For example, in case of updating the WUR parameters, a new Action Type value (e.g., 6) may be configured.

Alternatively, in case of updating the WUR parameters, the Action Type value may be indicated as "1" or "3". In case the Action Type value is indicated as "1" or "3", it may be unclear for the STA to recognize such value(s) as a case of updating the WUR parameters or as general "Enter WUR Mode Response" and "Enter WUR Mode Suspend Response" cases. However, since the WPC frame is an unsolicited frame, in case the Action Type value of "1" or "3" is received in a state where the WUR STA has not transmitted a "Enter WUR Mode Request" and a "Enter WUR Mode Suspend Request", the STA may easily know whether or not the received frame is a WPC frame.

Referring to FIG. 14, a WUR Mode Response Status field (1420) may be further included. This corresponds to a case where the field of FIG. 14 is used as a solicited frame. And, in this case, the field of FIG. 14 may include information on a response (response information) to a previous request, and the response information may include information on a reason why the response is being rejected. Referring to FIG. 14, a WUR Parameters Control field (1430) may be further included. The corresponding field may include control information of the related art.

Referring to FIG. 14, a WUR Parameters field (1440) may be further included. The WUR Parameters field (1440) may include information on parameters being updated through the WPC frame.

Figure 16:
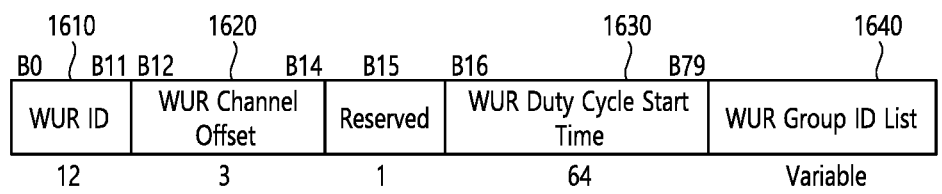
FIG. 16 illustrates a WUR Parameters field included in a WPC frame.

FIG. 16 illustrates a WUR Parameters field included in a WPC frame. That is, the WUR Parameters field (1440) of FIG. 14 may be configured as shown in an example of FIG. 16.

As shown in FIG. 16, a field of FIG. 16 may include a WUR ID field (1610). The WUR ID field (1610) may include a WUR ID that is updated. That is, in the corresponding field, an ID uniquely identifying a WUR STA within a BSS may be included.

Additionally, a field of FIG. 16 may include a WUR Channel Offset field (1620). The WUR Channel Offset field (1620) may include WUR channel information that is updated. More specifically, this field indicates the offset of the WUR channel on which WUP frames are transmitted that is relative to the WUR primary channel.

Additionally, a field of FIG. 16 may include a WUR Duty Cycle Start Time field (1630). The WUR Duty Cycle Start Time field (1630) may include information on a start point of a WUR Duty cycle that is updated.

Additionally, a field of FIG. 16 may include a WUR Group ID List field (1640). The WUR Group ID List field (1640) may indicate a WUR Group ID being assigned to the WUR STA.

FIG. 17 illustrates another example of detailed information included in a WPC frame.

Information of FIG. 17 may be included in the WPC frame together with the fields of FIG. 14. As shown in the drawing, the information of FIG. 17 may include information of WUR parameters being updated. That is the information of FIG. 17 may include information on a Minimum Wake-up Duration, or may include information on Duty Cycle Period Units, or may include information on WUR Operation Class, or may include information on a WUR operation channel, or may include information on a WUR beacon cycle. In case the information of FIG. 17 is/are omitted, the related parameter(s) may be treated as non-updated parameter(s).

Figure 18:
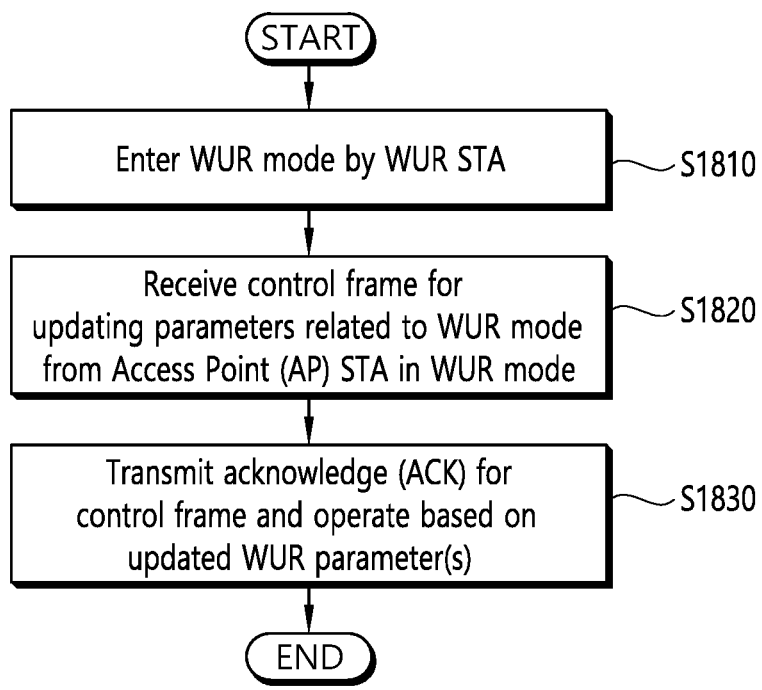
FIG. 18 is a procedure flow chart describing operations of a WUR STA according to this specification.

FIG. 18 is a procedure flow chart describing operations of a WUR STA according to this specification.

As shown in the drawing, in step S1810, the WUR STA enters the WUR mode. A method for entering the WUR mode may be variously determined, and, for example, the WUR STA may enter the WUR mode based on the example of FIG. 11, and so on. The WUR mode may be a period during which the WUR module alternates between the WUR on state and the WUR doze state.

In step S1820, in the WUR mode, the STA may receive a control frame for updating parameters related to the WUR mode from an Access Point (AP) STA. That is, in step S1820, a field of FIG. 14 may be received. In this case, the field of FIG. 14 may have a preconfigured Action Type field value. It will be preferable that the control frame is an unsolicited frame.

In step S1830, the STA transmits an acknowledge (ACK) frame for the control frame to the AP, and the STA is operated based on the updated WUR parameter(s). That is, after transmitting the ACK frame, subsequent operations may be performed by applying the WUR parameter(s) obtained in step S1820.

Figure 19:
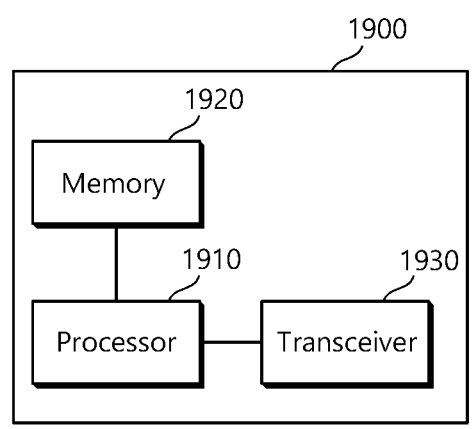
FIG. 19 illustrates an example of a user equipment (UE) applying an example of this specification.

FIG. 19 illustrates an example of a user equipment (UE) applying an example of this specification.

Referring to FIG. 19, a station (STA) (1900) includes a processor (1910), a memory (1920), and a transceiver (1930). Characteristics of FIG. 19 may be applied to a non-access point (AP) STA or an AP STA. Each of the processor, memory, and transceiver shown in the drawing may be implemented as an individual chip, or at least two or more blocks/functions may be implemented by a single chip.

The transceiver (1930) shown in the drawing performs signal transmission/reception operations. More specifically, the transceiver may transmit/receive a WUR packet or IEEE 802.11 packet.

The processor (1910) may implement functions, processes, and/or methods that are proposed in this specification. More specifically, the processor (1910) may receive a signal through the transceiver (1930), process the received signal, generate a transmission signal, and perform a control operation for signal transmission.

Such processor (1910) may include application-specific integrated circuit (ASIC), other chipset, logic circuit and/or data processor. The memory (1920) may include read-only memory (ROM), random access memory (RAM), flash memory, memory card, storage medium and/or other storage unit.

The memory (1920) may store a signal received through the transceiver (i.e., reception signal), and the memory (1920) may also store a signal that is to be transmitted through the receiver (i.e., transmission signal). That is, the processor (1910) may acquire the received signal through the memory (1920) and may store a signal that is to be transmitted in the memory (1920).

Figure 20:
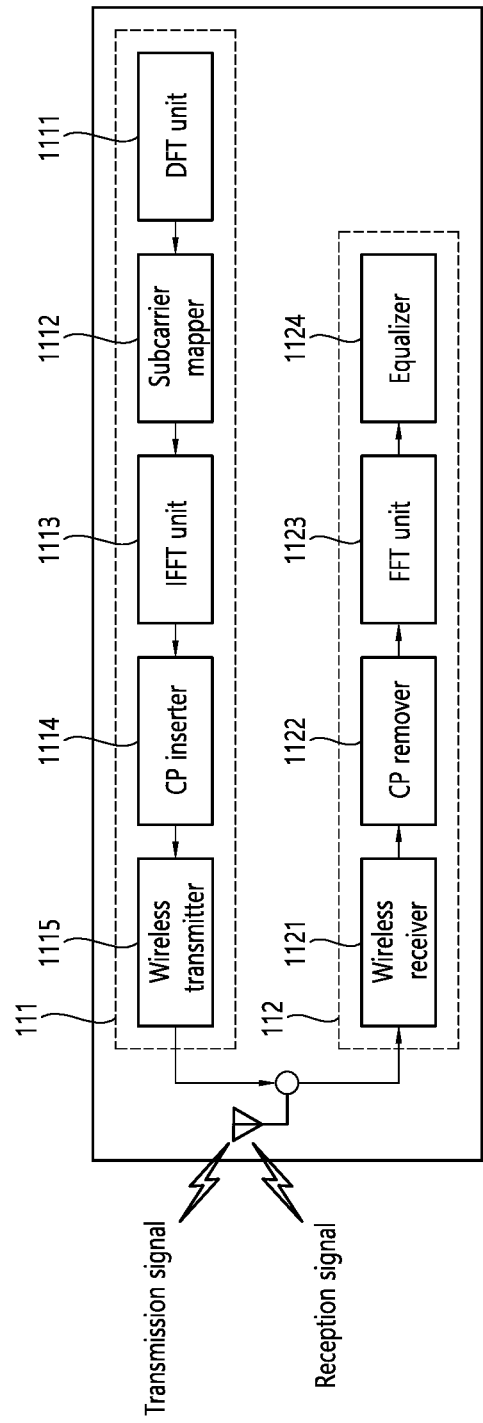
FIG. 20 illustrates another example of a detailed block diagram of a transceiver.

FIG. 20 illustrates another example of a detailed block diagram of a transceiver. Some or all of the blocks of FIG. 20 may be included in the processor (1910). Referring to FIG. 20, a transceiver (110) includes a transmitting part (111) and a receiving part (112). The transmitting part (111) includes a Discrete Fourier Transform (DFT) unit (1111), a subcarrier mapper (1112), an Inverse Fast Fourier Transform (IFFT) unit (1113), a CP inserter (1114), and a wireless transmitter (1115). The transmitting part may further include a modulator. Additionally, for example, a scramble unit (not shown), a modulation mapper (not shown), a layer mapper (not shown), and a layer permutator (not shown) may be further included, and these blocks may be positioned before the DFT unit (1111). That is, in order to prevent increase in a peak-to-average power ratio (PAPR), before mapping a signal to a subcarrier, the transmitting part (111) first allows information to pass through the DFT unit (1111). A signal being processed with spreading (or precoding, as a same meaning) by the DFT unit (1111) is processed with subcarrier mapping through the subcarrier mapper (1112), and, then, the processed signal passes through the Inverse Fast Fourier Transform (IFFT) unit (1113) so as to be processed as a signal on a time axis.

The DFT unit (1111) performs DFT on inputted symbols and outputs complex-valued symbols. For example, if Ntx symbols are inputted (wherein Ntx is an integer), a DFT size is equal to Ntx. The DFT unit (1111) may also be referred to as a transform precoder. The subcarrier mapper (1112) maps the complex-valued symbols to each subcarrier of the frequency domain. The complex-valued symbols may be mapped to resource elements corresponding to a resource block being allocated for data transmission. The subcarrier mapper (1112) may also be referred to as a resource element mapper. The IFFT unit (1113) performs IFFT on an inputted symbol and outputs a baseband signal for data, which is a time domain signal. The CP inserter (1114) duplicates (or copies) a portion of an end of the baseband signal for data and inserts the duplicated portion at a front part of the baseband signal for data. Since Inter-Symbol Interference (ISI) and Inter-Carrier Interference (ICI) are prevented by the CP insertion, orthogonality may be maintained in a multi-path channel.

Meanwhile, the receiving part (112) includes a wireless receiver (1121), a CP remover (1122), an FFT unit (1123), an equalizer (1124), and so on. Each of the wireless receiver (1121), the CP remover (1122), and the FFT unit (1123) of the receiving part (112) respectively performs inverse functions of the wireless transmitter (1115), the CP inserter (1114), and the IFFT unit (1113) of the transmitting part (111). The receiving part (112) may further include a demodulator.

In addition to the blocks shown in FIG. 20, the transceiver of FIG. 20 may include a reception window controller (not shown) extracting part of a reception signal, and a decoding operation processor (not shown) performing a decoding operation for a signal that is being extracted through the reception window.

What is claimed is:

1. A method for a wireless Local Area Network (WLAN) system, the method comprising:
    receiving, by a station (STA) including a main radio module receiving a WLAN packet and a Wake-Up Radio (WUR) module receiving a Wake-Up Radio (WUR) packet being modulated by an On-Off Keying (OOK) scheme, first and second control frames related to a WUR mode,
    wherein the WUR mode is a period during which the WUR module alternates between a WUR on state and a WUR doze state;
    wherein the first control frame includes:
        a first field related to a minimum wake-up duration of the WUR mode,
        a second field related to a duty cycle period unit of the WUR mode,
        a third field related to an operating class value for a WUR channel of the STA,
        a fourth field related to a channel number of the WUR channel, and
        a fifth field related to a beacon period for the WUR mode,
    wherein the first field is contiguous to the second field, the second field is contiguous to the third field, the third field is contiguous to the fourth field, and the fourth field is contiguous to the fifth field,
    wherein the second control frame includes:
        an action type field identifying a WUR mode operation of the STA,
        a WUR mode response status field related to status returned by an Access Point (AP) STA responding to the STA, and
        a WUR parameters field containing a plurality of subfields related to the WUR mode,
    wherein the WUR parameters field includes a first subfield having a 12-bit WUR ID of the STA, a second sub-field having a 3-bit offset value of a channel on which the WUR packet is transmitted relative to the WUR channel, a third sub-field having a size of 1 bit, and a fourth sub-field having a 64-bit time value for a start point of a WUR duty cycle, wherein the first sub-field is contiguous to the second sub-field, the second sub-field is contiguous to the third sub-field, and the third sub-field is contiguous to the fourth sub-field; and performing, by the STA, an operation based on the first and second control frames.

2. The method of claim 1, wherein each of the action type field and the WUR mode response status field has a size of 8 bits.

3. The method of claim 1, wherein the first and second control frames are decoded by a Medium Access Control (MAC) layer of the STA.

4. A station (STA) in a wireless Local Area Network (WLAN) system, the STA comprising:
a main radio receiver configured for receiving a WLAN packet;
a Wake-Up Radio (WUR) receiver configured for receiving a Wake-Up Radio (WUR) packet being modulated by an On-Off Keying (OOK) scheme; and
a processor including the main radio receiver and the Wake-up Radio receiver,
the processor being configured to:
receive first and second control frames related to a WUR mode,
wherein the WUR mode is a period during which the WUR module alternates between a WUR on state and a WUR doze state,
wherein the first control frame includes:
a first field related to a minimum wake-up duration of the WUR mode,
a second field related to a duty cycle period unit of the WUR mode,
a third field related to an operating class value for a WUR channel of the STA,
a fourth field related to a channel number of the WUR channel, and
a fifth field related to a beacon period for the WUR mode,
wherein the first field is contiguous to the second field, the second field is contiguous to the third field, the third field is contiguous to the fourth field, and the fourth field is contiguous to the fifth field,
wherein the second control frame includes:
an action type field identifying a WUR mode operation of the STA,
a WUR mode response status field related to status returned by an Access Point (AP) STA responding to the STA, and
a WUR parameters field containing a plurality of sub-fields related to the WUR mode,
wherein the WUR parameters field includes a first sub-field having a 12-bit WUR ID of the STA, a second sub-field having a 3-bit offset value of a channel on which the WUR packet is transmitted relative to the WUR channel, a third sub-field having a size of 1 bit, and a fourth sub-field having a 64-bit time value for a start point of a WUR duty cycle,
wherein the first sub-field is contiguous to the second sub-field, the second sub-field is contiguous to the third sub-field, and the third sub-field is contiguous to the fourth sub-field, and
perform an operation based on the first and second control frames.

5. The STA of claim 4, wherein each of the action type field and the WUR mode response status field has a size of 8 bits.

6. The STA of claim 4, wherein the first and second control frames are decoded by a Medium Access Control (MAC) layer of the STA.

* * * * *